(12) United States Patent
Beckham et al.

(10) Patent No.: US 12,501,954 B2
(45) Date of Patent: Dec. 23, 2025

(54) MULTILAYERED MULTIFUNCTIONAL HEAT-MANAGEMENT MATERIAL

(71) Applicant: Columbia Sportswear North America, Inc., Portland, OR (US)

(72) Inventors: Haskell Beckham, Portland, OR (US); Rebecca Lynn Johnson, Portland, OR (US); David Milton Anderson, Atlanta, GA (US)

(73) Assignee: Columbia Sportswear North America, Inc., Portland, OR (US)

( * ) Notice: Subject to any disclaimer, the term of this patent is extended or adjusted under 35 U.S.C. 154(b) by 41 days.

(21) Appl. No.: 17/069,493

(22) Filed: Oct. 13, 2020

(65) Prior Publication Data

US 2021/0112895 A1 Apr. 22, 2021

Related U.S. Application Data

(60) Provisional application No. 62/916,097, filed on Oct. 16, 2019.

(51) Int. Cl.
*A41D 31/04* (2019.01)
*A41D 31/02* (2019.01)
(Continued)

(52) U.S. Cl.
CPC ............. *A41D 31/04* (2019.02); *A41D 31/02* (2013.01); *B32B 5/02* (2013.01); *B32B 15/14* (2013.01);
(Continued)

(58) Field of Classification Search
None
See application file for complete search history.

(56) References Cited

U.S. PATENT DOCUMENTS

| 4,539,714 A | 9/1985 | Fratti | |
|---|---|---|---|
| 4,569,874 A * | 2/1986 | Kuznetz | A41D 31/102 428/920 |

(Continued)

FOREIGN PATENT DOCUMENTS

| CA | 2620005 A1 | 7/2008 |
|---|---|---|
| CN | 101418094 A | 4/2009 |

(Continued)

OTHER PUBLICATIONS

Ullah, et al.; "A review of noteworthy/major innovations in wearable clothing for thermal and moisture management from material to fabric structure;" Article in Textile Research Journal, Jul. 2021; https://www.researchgate.net/publication/353021767; 37 pages.

(Continued)

*Primary Examiner* — Tamra L. Dicus
(74) *Attorney, Agent, or Firm* — Schwabe, Williamson & Wyatt, P.C.

(57) ABSTRACT

A heat-management material that includes a base fabric having an externally facing surface and an internally facing surface; and a plurality of multilayered multifunctional heat-management elements coupled to the externally facing surface of the base material wherein the heat-management material has weighted average thermal emittance of less than 0.8 (or 80%). The multilayered multifunctional heat-management elements include a low thermal emittance layer and a high solar absorptance layer.

16 Claims, 17 Drawing Sheets

(51) Int. Cl.
 *B32B 5/02* (2006.01)
 *B32B 15/14* (2006.01)
(52) U.S. Cl.
 CPC ....... *B32B 2255/02* (2013.01); *B32B 2255/26* (2013.01); *B32B 2307/30* (2013.01); *B32B 2307/4026* (2013.01); *B32B 2437/02* (2013.01); *B32B 2437/04* (2013.01)

(56) References Cited

U.S. PATENT DOCUMENTS

| | | | | |
|---|---|---|---|---|
| 5,032,705 | A | * | 7/1991 | Batcheller ............ H05B 3/342 |
| | | | | 219/211 |
| 5,130,353 | A | | 7/1992 | Fischer et al. |
| 5,524,381 | A | * | 6/1996 | Chahroudi ............ F24S 80/56 |
| | | | | 52/173.3 |
| 5,960,476 | A | | 10/1999 | Danzy |
| 2003/0054141 | A1 | * | 3/2003 | Worley ................ D06M 23/16 |
| | | | | 442/131 |
| 2006/0186219 | A1 | | 8/2006 | Kent |
| 2010/0282433 | A1 | * | 11/2010 | Blackford ............ A41D 31/102 |
| | | | | 165/46 |
| 2011/0203783 | A1 | * | 8/2011 | Blackford .............. D06Q 1/04 |
| | | | | 165/185 |
| 2012/0291179 | A1 | | 11/2012 | Shea |
| 2012/0299573 | A1 | * | 11/2012 | Vangool ................ H01F 38/32 |
| | | | | 323/358 |
| 2013/0042390 | A1 | | 2/2013 | Blackford et al. |
| 2013/0118634 | A1 | | 5/2013 | Chiang et al. |
| 2013/0133353 | A1 | * | 5/2013 | Araujo .................. F25D 31/00 |
| | | | | 62/331 |
| 2013/0133532 | A1 | | 5/2013 | Kian et al. |
| 2013/0212789 | A1 | * | 8/2013 | Conolly ................ B32B 27/12 |
| | | | | 428/221 |
| 2014/0356574 | A1 | * | 12/2014 | Conolly ................ B32B 5/026 |
| | | | | 204/192.15 |
| 2014/0357542 | A1 | * | 12/2014 | Lant ...................... C11D 3/42 |
| | | | | 510/301 |
| 2016/0115081 | A1 | * | 4/2016 | Cho ...................... C25D 9/04 |
| | | | | 422/119 |
| 2016/0331054 | A1 | * | 11/2016 | Coza ...................... A41D 1/04 |
| 2018/0192720 | A1 | * | 7/2018 | Blackford .............. B32B 27/36 |
| 2019/0092950 | A1 | | 3/2019 | Phan et al. |
| 2019/0116902 | A1 | * | 4/2019 | Blackford .............. A41D 31/04 |
| 2020/0353720 | A1 | * | 11/2020 | Cui ...................... B32B 27/32 |
| 2022/0087347 | A1 | | 3/2022 | Cay |

FOREIGN PATENT DOCUMENTS

| | | |
|---|---|---|
| CN | 102551229 A | 7/2012 |
| CN | 102783741 A | 11/2012 |
| CN | 104126969 | 11/2014 |
| CN | 105459476 | 4/2016 |
| CN | 109605864 A | 4/2019 |
| CN | 109629228 A | 4/2019 |
| CN | 209750069 U | 12/2019 |
| CN | 111806004 A | 10/2020 |
| CN | 116420947 A | 7/2023 |
| DE | 202018106788 U1 | 12/2018 |
| ES | 12334737 | 3/2010 |
| JP | 61-252364 A | 11/1986 |
| JP | 62-199809 A | 9/1987 |
| JP | 62210449 A | 9/1987 |
| JP | H02-234980 A | 9/1990 |
| JP | H03-045900 A | 2/1991 |
| JP | 2004-257643 A | 9/2004 |
| JP | 2005256185 A | 9/2005 |
| JP | 2020-507127 A | 3/2020 |
| KR | 10-2021-0055392 A | 5/2021 |
| TW | I261640 B | 9/2006 |
| WO | 2021149088 A1 | 7/2021 |

OTHER PUBLICATIONS

"Clean Imper Jacket—Men's;" https://www.backcountry.com/louis-garneau-clean-Imper-jacket-mens.

* cited by examiner

MULTILAYERED MULTIFUNCTIONAL HEAT-MANAGEMENT MATERIAL

CROSS-REFERENCE TO RELATED APPLICATION

This application claims the priority benefit of the earlier filing date of U.S. Provisional Application No. 62/916,097, filed Oct. 16, 2019, which is hereby incorporated herein by reference in its entirety.

TECHNICAL FIELD

This disclosure relates generally to a base material, such as a fabric, for body gear and other goods having designed performance characteristics, and in particular to technical gear, such as garments, that use multilayered heat-management elements coupled to the exterior facing surface of a base material to restrict heat transmission to the environment from the exterior facing surface of the base material, and additionally trap solar radiation and convert it to heat that is directed toward the interior of the base material.

BACKGROUND

Insulating heat-reflective materials typically take the form of a base material onto which a unitary metallic film or discrete pattern of metallic elements are glued or otherwise attached. The insulating heat-reflective material is used as the interior surface of a garment, such as a jacket. The metallic film or patterned heat reflective elements are arranged on the interior surface, for example an inward facing surface, of the garment to reflect the body heat of the wearer back to the interior, or body side of the garment, thereby retaining body-generated heat and keeping the garment wearer warm in colder conditions. While these materials do provide increased heat retention, there is a continued need for new materials that provide better heat management.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
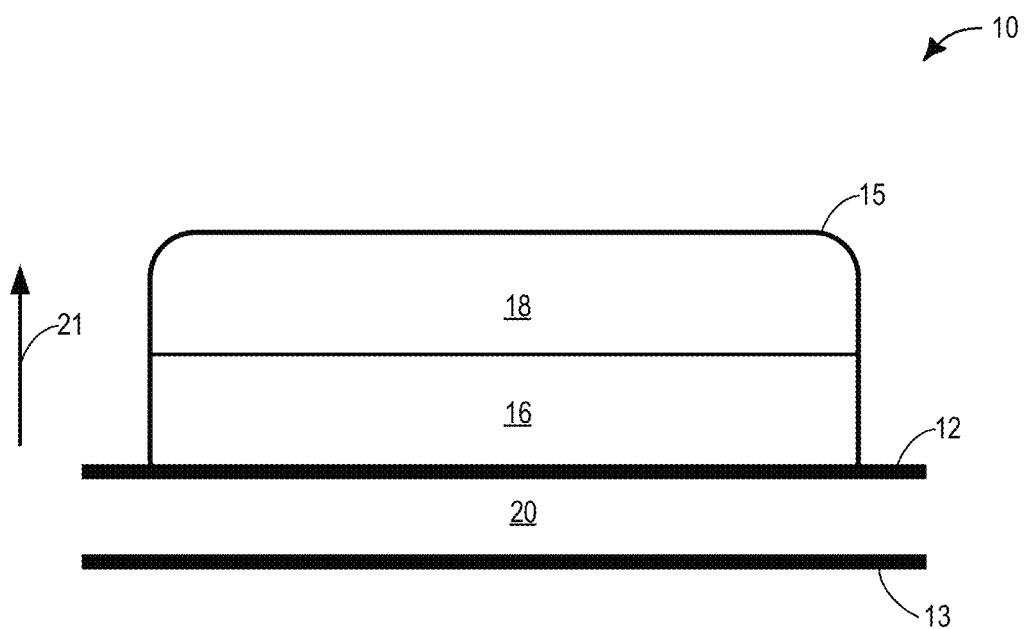
FIG. 1 is a schematic drawing of a multilayered multifunctional heat-management element as coupled to base material.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

The term "colorant" means a substance that is added to change the color of a material, such as a high solar absorptance layer, for example a polymeric overlayer. Most colorants can be classified as dyes or pigments, or containing some combination of these.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Omni-Heat™ reflective materials work by reflecting thermal radiation back to the body. Materials that are important for this performance are metals including but not limited to aluminum, silver, and gold. In addition to exhibiting high reflectance in the 2.5 to 40 micron wavelength range, these materials also exhibit low emittance in the same wavelength range. In other words, these materials exhibit high thermal reflectance and low thermal emittance.

Examination of the mathematics for the major modes of heat transfer—conduction, convection and radiation—reveals that one term is common for all three: ΔT, which is the temperature difference between the material losing heat and the material/environment gaining heat. These equations are shown below.

$$q_{convection} = hA(T_s - T_a) \quad (1)$$

$$q_{conduction} = kA\frac{(T_1 - T_2)}{x} \quad (2)$$

-continued $$q_{radiation} = \sigma \varepsilon A(T_1^4 - T_2^4) \quad (3)$$

With reference to the above equations, $q_{convection}$ is heat transfer due to convection, where h is the convection heat transfer coefficient, $T_s$ is the surface temperature and $T_a$ is the ambient temperature; $q_{conduction}$ is heat transfer due to conduction, where k is thermal conductivity, A is the cross-sectional area through which conduction is occurring, $T_1$ is the temperature of the object losing heat and $T_2$ is the temperature of the object receiving heat; and $q_{radiation}$ is heat transfer due to radiation, where σ is the Boltzmann constant, ε is the weighted average thermal emittance, A is the surface area, $T_1$ is the temperature of the surface and $T_2$ is the temperature of the object or environment receiving heat.

Consider the scenario in which the environmental ambient temperature is lower than body temperature. Since apparel and footwear materials are worn next to the body as heat source, and because there is some conductive heat transfer between the body and the material worn over it, then the temperature difference (ΔT) between the body and the adjacent material is typically smaller than the ΔT between the outermost material layer and the environment. Thus, material modifications made to restrict the heat transfer between the outermost material layer and the environment can have a larger effect on total heat retention than modifications made to restrict heat transfer between the body and the innermost or adjacent material layer.

Materials with low thermal emittance, such as metals, can be applied to the outermost material layer to restrict radiation heat transfer to the environment and provide for apparel and footwear with enhanced heat retention. Thus, aluminum can be used for this purpose. However, aluminum may oxidize and abrade when exposed to the environment and during use on the outermost layer of a garment. The thermal emittance of the surface of a material is its effectiveness in emitting energy as thermal radiation. Quantitatively, thermal emittance is the ratio of the thermal radiation emitted by a surface to the radiation that would be emitted by an ideal blackbody surface at the same temperature as given by the Stefan-Boltzmann law. The ratio varies from 0 to 1 (e.g., 100%), where the surface of a perfect blackbody radiator would have an emittance of 1 while a surface that solely reflects thermal radiation from its surroundings would have an emittance of 0.

A protective polymer layer on top of a metal surface, such as aluminum, can protect the metal surface and prevent oxidation and abrasion. Unfortunately, polymer coatings have high thermal emittances, which negates the effect of placing a metal having a low thermal emittance on the exterior of a garment for the purpose of minimizing radiant heat losses to the surroundings and thereby increasing heat retention in the garment. The conventional wisdom in view of these observations would be to place the metallic elements in the interior of the garment as is the case in garments that use the Omni-Heat™ Reflective technology.

Contrary to this conventional wisdom, the inventors herein disclose a multilayered construction of metal (e.g., aluminum) with a polymeric overlayer, which together provide for a multilayered heat-management element that surprisingly exhibits low thermal emittance as compared to the base materials used in garment construction. As detailed in the Examples below, testing of this multilayered construction revealed, surprisingly, that this multilayered heat-managing element provides weighted average emittances of around 0.1 (e.g. 10%) (emittance scales from 0 to 1, so 0.1 is a low value), for example 0.07-0.13 (e.g., 7%-13%). These multilayered heat-management elements were coupled to the outside of different base fabrics and tested using standard hotplate methods. Even at 30% surface coverage, the multilayered heat-management elements increased thermal resistance of the different base fabrics by 20 to 67% (see Table 1), which is significant and surprising.

Furthermore, by adding a colorant to the protective polymeric overlayer, absorption of solar radiation can occur and enhance the heat-retention capabilities of the multilayered elements, thereby making them multifunctional as well. For example, a black colorant may result in maximum solar absorptance (e.g., absorptance of energy at wavelengths between 0.3 and 2.5 µm) so that the multilayered and multifunctional heat-management elements provide, when applied to the exterior surface of a garment, significantly enhanced heat retention properties when sunlight is present, as direct or scattered sunlight. At 55% surface coverage, the multilayered heat-management elements increased thermal resistance of different base fabrics by 15 to 73% (see Table 2), which is significant and surprising. Furthermore, as the results shown in FIG. 14 demonstrate, the multilayered heat-management elements may function, surprisingly, as solar collectors that absorb more heat, conduct it into the base fabric to which they are coupled and underlying insulation, and hold this heat longer than a base fabric with a similar solar absorptance.

Because black colorants are typically emissive, a person of ordinary skill in the art might expect that increased absorptance might be offset by the increased thermal emittance (e.g., emittance at wavelengths between 5 and 40 µm) of the black colorant. However, surprisingly, testing has revealed that this is not the case. Even with a black colorant in the polymeric overlayer, a multilayered heat-management element still reduces the overall average thermal emittance of a base fabric, leading to increased heat retention. In another embodiment, a photochromic colorant can be used in the polymeric overlayer that turns from clear to colored, such as black, when the sun is shining to achieve both maximized low emittance when the sun is not shining, and maximized solar absorptance when the sun is shining. Photochromic colorants may be classified as P-type or T-type. P-type photochromic colorant systems may be switched in each direction with different wavelengths of light. P-type systems change color when irradiated with a specific wavelength range, then remain in this state after a removal of the stimulus. It is only when they are subjected to light of a different set of wavelengths that they return to their original color. Alternatively, T-type behavior is exhibited if light is able to drive the change in just one direction. T-type systems may fade back to their original state, through a thermal back-reaction, when they are no longer exposed to the light source. Reversibility is an important aspect of both types of photochromism, for example light-sensitive materials that undergo changes of an irreversible nature may not be considered photochromic. Real-world colorants may not always match the strict definitions of the two types of behavior described above, but most are readily categorized. Examples of T-type colorants of the present disclosure may include but are not limited to spiropyrans, spirooxazines, and napthopyrans, among others. Examples of P-type colorants of the present disclosure may include but are not limited to diarylethenes and fugides, among others.

Referring to FIG. 1, the disclosed heat-management material 10 includes a base fabric 20 having an externally facing surface 12 (e.g., outward facing surface with respect to the body of a wearer of the material), and an internally facing surface 13 (e.g., inward facing surface with respect to the body of a wearer of the material), that can have one or more performance characteristics. Disclosed herein, internally facing surface 13 may be understood to be closer to a body of a wearer of heat management material 10 as compared to externally facing surface 12. Coupled to the externally facing surface 12 of the base fabric are a plurality of multilayered multifunctional heat-management elements 15, wherein the placement and spacing of the plurality of multilayered multifunctional heat-management elements leaves a portion of the base fabric uncovered and enables the base material to retain at least partial performance of the performance characteristic. These multilayered multifunctional heat-management elements 15 have been specifically developed as herein disclosed to provide heat-management material 10, such as a fabric, with high solar absorptance at wavelengths between 0.3 and 2.5 µm and yet low thermal emittance at wavelengths ranging from 5 and 40 µm, such that it is able to retain heat and absorb solar radiation to provide a better heat-management material 10 than a base fabric 20 in the absence of the multilayered multifunctional heat-management elements 15.

In embodiments, each multilayered multifunctional heat-management element 15 has a low thermal emittance layer 16. In embodiments, the low thermal emittance layer 16 of the multilayered multifunctional heat-management elements 15 are a discontinuous array of a foil, such as a metallic foil (e.g., malleable metals including but not limited to aluminum, copper, tin, silver and gold), which in specific embodiments is an aluminum foil. In addition to the low thermal emittance layer 16, the multilayered multifunctional heat-management elements 15 include a high solar absorptance layer 18 located on the outermost surface of the heat-management element 15, for example over the top of the outward facing surface of the low thermal emittance layer 16. For reference, "outward facing" is exemplified by the direction shown by arrow 21 at FIG. 1. The multilayered multifunctional heat-management elements 15 may include additional layers such as a release layer, an adhesive layer, a protective layer against abrasion and oxidation and the like, however layer thicknesses must remain sufficiently small that the weighted average emittance of a fabric onto which the multilayered multifunctional heat-management elements are coupled to the exterior surface does not increase back to the level of the fabric itself. In embodiments, the multilayered multifunctional heat-management elements 15 exhibit weighted average thermal emittances of 0.1 to 0.85 (e.g., 10%-85%), preferably less than 0.7, and most preferably less than 0.5. In embodiments, the heat-management material 10 onto which the multilayered multifunctional heat-management elements 15 are coupled to the exterior surface exhibit weighted average thermal emittances less than 0.9 (e.g., 90%), preferably less than 0.7 (e.g., 70%), and most preferably less than 0.5 (e.g., 50%). In embodiments, the heat-management material 10 has an emittance that is between about 10% and about 80%, such as about 15-65%, about 30-80%, about 10-50%, 30-70%, or about 40-60%. Thus, discussed herein a low thermal emittance layer refers to a layer (e.g., low thermal emittance layer 16) that renders a multifunctional heat-management element (e.g., multifunctional heat-management element 15) with a weighted average thermal emittance of 0.1 to 0.85, preferably less than 0.7, most preferably less than 0.5, and/or which renders a heat management material (e.g., heat management material 10) with a weighted average thermal emittance less than 0.9, preferably less than 0.7, most preferably less than 0.5.

In embodiments, the multilayered multifunctional heat-management elements 15 exhibit weighted average solar absorptances of at least 50% (e.g., 0.5), such as greater than 50%, greater than 55% (e.g., 0.55), greater that 60% (e.g., 0.60), greater than 65% (e.g., 0.65), greater than 70% (e.g., 0.70), greater than 75% (e.g., 0.75), greater that 80% (e.g., 0.80), greater than 85% (e.g., 0.85), or even greater than 90% (e.g., 0.90) solar absorptance. In embodiments, the heat-management material 10 onto which the multilayered multifunctional heat-management elements 15 are coupled to the exterior surface exhibit weighted average solar absorptances of at least 50%, such as greater than 50%, greater than 55%, greater that 60%, greater than 65%, greater than 70%, greater than 75%, greater that 80%, greater than 85%, or even greater than 90% weighted average solar absorptance. Absorptance, as herein discussed, refers to a fraction of absorbed light to incident light, hence absorptance scales from 0 to 1, where a value of 1 implies all incident light is absorbed. Further, a high solar absorptance layer as herein disclosed is a layer (e.g., high solar absorptance layer 18) that renders a multilayered multifunctional heat-management element (e.g., multilayered multifunctional heat-management elements 15) with a weighted average solar absorptance of at least 0.5, or at least 0.55, or at least 0.6, or at least 0.65, or at least 0.7, or at least 0.75, or at least 0.80, or at least 0.85, or at least 0.90 and/or which renders a heat management material (e.g., heat management material 10) with a weighted average solar absorptance of at least 0.5, or at least 0.55, or at least 0.6, or at least 0.65, or at least 0.7, or at least 0.75, or at least 0.80, or at least 0.85, or at least 0.90.

In embodiments, the multilayered multifunctional heat-management elements 15 are relatively small, such as dots that are 0.1 to 10 mm in diameter, so as not to unduly interfere with the performance characteristics of the base fabric 20. Thus, in various embodiments, a base fabric 20, for example for body gear, is disclosed that may use a plurality of multilayered multifunctional heat-management elements 15 coupled to the outward facing surface of the base fabric 20, such as the outward facing surface of the outermost layer of a garment. In an embodiment, a discontinuous pattern of multilayered multifunctional heat-management elements 15 manages body heat by absorbing solar radiation while mitigating the emission of radiant heat back to the environment from the surface of the outermost layer of a garment.

In embodiments, a plurality of multilayered multifunctional heat-management elements 15 are disposed on the outward facing surface of a base fabric 20 in a generally discontinuous array, whereby some of the base fabric 20 is exposed between adjacent multilayered multifunctional heat-management elements 15. In various embodiments, the multilayered multifunctional heat-management elements 15 may be arranged in an array of separate elements, whereas in other embodiments, discussed at greater length below, the multilayered multifunctional heat-management elements 15 may be arranged in an interconnected pattern. In some embodiments, multilayered multifunctional heat-management elements 15 may take the form of a solid shape or closed loop member, such as a circle, square, hexagon, or other shape, including an irregular shape. In other embodiments, the discontinuous pattern of multilayered multifunctional heat-management elements 15 may take the form of a lattice, grid, or other interconnected pattern.

Generally, a sufficient surface area of the outward facing surface of base fabric 20 should be exposed to provide the desired base fabric performance characteristic or function (e.g., stretch, drape, texture, breathability, moisture vapor transfer, air permeability, and/or wicking). For example, if there is too little exposed base fabric, properties such as moisture vapor transfer and/or air permeability may suffer, and even disproportionately to the percentage of coverage. As used herein, the term "surface coverage area" refers to a measurement taken from a unit cell, for example, a unit cell can be a region that includes a plurality of multilayered multifunctional heat-management elements. In an example a unit cell is at least a 1 inch by 1 inch unit cell at a given point in the fabric of the discontinuous array of multilayered multifunctional heat-management elements and does not necessarily correspond to the percentage of the entire garment covered by multilayered multifunctional heat-management elements, for example a 1 inch by 1 inch unit cell (25.4 mm by 25.4 mm unit cell), a 2 inch by 2 inch unit cell (50.8 mm by 50.8 mm unit cell), a 3 inch by 3 inch unit cell (76.2 mm by 76.2 mm unit cell) and the like. In an example, a unit cell may be the entire exterior surface of a material measured from seam to seam on a given garment.

The multilayered multifunctional heat-management elements 15 cover a sufficient surface area of the outward facing surface of base fabric 20 to generate the desired degree of heat management (e.g., mitigation of heat emission or absorption of solar radiation, for example, when exposed to direct or even indirect sunlight, or both mitigation of heat emission and absorption of solar radiation). A sufficient area of outward facing surface of base fabric 20 may be exposed to provide, or maintain, the desired base fabric performance characteristic or function (e.g., breathability, moisture vapor or air permeability, or wicking). In various embodiments, multilayered multifunctional heat-management elements 15 may cover a sufficient surface area of the base fabric 20 to achieve the desired degree of heat management, for example, having a surface coverage area of the multilayered multifunctional heat-management elements 15 of about 5-95%, about 10-90%, about 20-80%, 30-70%, 40-60% or even about 55% in various embodiments, for example in specific unit cell, such as a 1 inch by 1 inch unit cell (25.4 mm by 25.4 mm unit cell). In a given article or even a portion of the article, the surface area coverage by the multilayered multifunctional heat-management elements may be consistent or it may vary within or across regions of the article.

In embodiments, the individual multilayered multifunctional heat-management elements 15 are about 1 mm in diameter although larger and smaller sizes are contemplated. In embodiments, the individual multilayered multifunctional heat-management elements 15 are in the range from about 0.1 mm in diameter to about 10.0 mm in diameter, such as about 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0 mm in diameter or any value or range within. In embodiments, the individual multilayered multifunctional heat-management elements 15 in a specific region are spaced apart by about 0.1 to about 10.0 mm, such as about 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0 mm or any value or range within. As used herein diameter is the average distance from the center of the multilayered multifunctional heat-management elements 15 regardless of shape, for example the geometric center of the multilayered multifunctional heat-management element 15, such as the center of a circle, triangle, square, polygon, or even an irregular shape. One of ordinary skill in the art is capable of determining the geometric center of a shape.

In embodiments, the low thermal emittance layer 16 of the individual multilayered multifunctional heat-management elements 15 comprise or consist of a metal foil, for example an aluminum foil, that has a thickness in the range from about 5 nm to about 100 nm thick, such as about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm thick, or any value or subrange within contemplated.

In embodiments, the high solar absorptance layer 18 is a polymer or mixture of polymers having a thickness in the range from about 0.1 µm to about 10.0 µm thick, such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.5, 3.0, 3.5, 4.0, 4.5, 5.0, 5.5, 6.0, 6.5, 7.0, 7.5, 8.0, 8.5, 9.0, 9.5, or 10.0 µm thick, or any value or subrange are also contemplated. Examples of polymers relevant to the present disclosure may include but are not limited to polyethylene, polypropylene, polystyrene, poly(tetrafluoroethylene), polyisobutylene, polyacrylonitrile, polybutadiene, poly(vinyl chloride), poly(methyl acrylate), poly(methyl methacrylate), polybutadiene, polychloroprene, poly(cis-1,4-isoprene), poly(trans-1,4-isoprene), polyurethane, polyester, polyamide, polyether, polyolefin, polyacrylate, poly(3-hydroxybutyric acid) (PHB), poly[(R)-3-hydroxybutyrate-co-(R)-3-hydroxyvalerate] (PHBV), 3-hydroxybutyrate and 3-hydroxyhexanoate (PHBH), polylactic acid (PLA), cellulose, chitin, lacquer and natural rubber, among others, or copolymers or combinations thereof. In embodiments, the high solar absorptance layer 18 includes a colorant, such as a colorant that aids in the absorption of solar energy. In one example the colorant is a black colorant. In certain examples, the high solar absorptance layer 18 is present only on the exterior surface of the multilayered multifunctional heat-management elements 15. In other examples, the high solar absorptance layer 18 can cover, at least partially, portions of the base fabric that do not have the individual multilayered multifunctional heat-management elements 15 coupled thereto, for example as a coating over both the low thermal emittance layer 16 and the base fabric 20.

The multilayered multifunctional heat-management elements 15 are disposed on the exterior surface of the body gear and/or outermost facing surface of a base fabric 20 such that they are exposed to the environment, which may allow the multilayered multifunctional heat-management elements 15, for example, to mitigate radiant heat emission to the environment and absorb solar radiation, while allowing the base fabric 20 to adequately perform its desired functions. In some embodiments, the multilayered multifunctional heat-management elements 15 may perform these functions without adversely affecting the drape, feel, or other properties of the base fabric. In accordance with various embodiments, the base fabric 20 may be a part of any form of body gear, bodywear, blankets, tents, rain flys, sleeping bags, or any material or apparatus where heat management is desired. Bodywear, as used herein, includes anything worn on the body, such as, but not limited to, athletic wear such as compression garments, t-shirts, shorts, tights, sleeves, headbands and the like, outerwear, such as jackets, pants, leggings, shirts, gloves, hats, and the like, and footwear.

In various embodiments, the multilayered multifunctional heat-management elements 15 may be disposed on the outward facing surface of base fabric 20 having one or more desired properties or characteristics. In some embodiments, the base fabric 20 may have other desirable attributes, such as abrasion resistance, anti-static properties, anti-microbial activity, water repellence, flame repellence, hydrophilicity, hydrophobicity, wind resistance, solar protection, SPF protection, resiliency, stain resistance, wrinkle resistance, and the like. In other embodiments, the separations between heat-management elements 15 help allow the exterior facing surface of a base fabric 20 to have a desired drape, look, and/or texture. Suitable base fabrics 20 may include nylon, polyester, polypropylene, rayon, cotton, spandex, wool, silk, or a blend thereof, or any other material having a desired look, feel, weight, thickness, weave, construction, texture, or other desired property. In various embodiments, allowing a designated percentage of the base fabric to remain uncovered by the multilayered multifunctional heat-management elements 15 may allow that portion of the base fabric 20 to perform the desired functions.

In various embodiments, a single layer of base fabric 20 may be used comprising the base fabric 20 including an exterior facing surface upon which the multilayered multifunctional heat-management elements 15 are disposed, whereas other embodiments may use multiple layers of fabric, including a layer of the base fabric 20, coupled to one or more other layers, where the base fabric 20 is the exterior layer with an exterior facing surface upon which the multilayered multifunctional heat-management elements 15 are disposed, for example overlying insulating layers. In certain embodiments, the individual multilayered multifunctional heat-management elements 15 are individually coupled, such as glued, and/or bonded to the base fabric. In certain embodiments, the multilayered multifunctional heat-management elements 15 are directly coupled to the base fabric.

In various embodiments, the multilayered multifunctional heat-management elements 15 may be permanently coupled to the base fabric 20 in a variety of ways, including, but not limited to gluing, heat pressing, printing, or stitching. In some embodiments, the multilayered multifunctional heat-management elements 15 may be coupled to the base fabric 20 by frequency welding, such as by radio or ultrasonic welding. In some embodiments, the multilayered multifunctional heat-management elements 15 may be coupled to the base fabric using gravure printing. In some specific, non-limiting examples, the gravure printing process may use an engraved roller running in an adhesive bath, which fills the engraved dots or lines of the roller with the adhesive material (e.g., the adhesive that will bond the multilayered multifunctional heat-management elements 15 to the base fabric). The excess adhesive on the roller may be wiped off using a blade, and the adhesive may then be deposited onto the foil containing the multilayered multifunctional heat-management material on a carrier material as it passes between the engraved roller and a pressure roller. The multilayered multifunctional heat-management material is positioned on the carrier material such that the high solar absorptance layer is closer to the carrier material than the low thermal emittance layer, and the adhesive is applied to the surface opposite from the carrier material. In various embodiments, the gravure printing process may include direct gravure, reverse gravure, or differential offset gravure, and in various embodiments, the adhesive weight may be controlled by the percent of solids, the gravure volume, the pattern depth, and/or the speed of the gravure cylinder. Following application of the adhesive by gravure printing to the foil, a substrate (e.g., the base fabric 20) is laminated to the adhesive-containing foil. The laminate is then pressed and cured in a continuous process, after which the carrier material is peeled off to leave multilayered multifunctional heat-management elements 15 on the substrate in a pattern consistent with the pattern engraved on the gravure roller.

In various embodiments, the multilayered multifunctional heat-management elements 15 may be applied in a pattern or a continuous or discontinuous array. For example, as illustrated in FIGS. 15A-15H, the heat-management elements may take the form of an array of discrete solid or closed loop members, adhered or otherwise secured to the base fabric in a desired pattern. Such a configuration has been found to provide insulation to the user while still allowing the base fabric to perform desired properties (e.g., breathe and stretch). In various embodiments, such discontinuous, discrete, separate multilayered multifunctional heat-management elements may take the form of circles, triangles, squares, pentagons, hexagons, octagons, stars, crosses, crescents, ovals, or any other suitable shape.

Although the embodiments illustrated in FIGS. 15A-15H show the multilayered multifunctional heat-management elements as separate, discrete elements, in some alternate embodiments, some or all of the multilayered multifunctional heat-management elements may be arranged such that they are in connection with one another, such as stripes, wavy lines, or a matrix/lattice pattern or any other pattern that permits partial coverage of the base fabric. For example, as illustrated in FIGS. 16A-16F, the configuration of the multilayered multifunctional heat-management elements disposed on a base fabric may be in the form of a variety of partially or completely connected elements, and the pattern may combine both discontinuous elements (such as those illustrated in FIGS. 15A-15H) and interconnected geometrical patterns (such as those illustrated in FIGS. 16A-16F). In various embodiments, the pattern of multilayered multifunctional heat-management elements may be symmetrical, ordered, random, and/or asymmetrical. Further, as discussed below, the pattern of multilayered multifunctional heat-management elements may be disposed on the base fabric at strategic locations to improve the performance of bodywear. In various embodiments, the size and/or spacing of the multilayered multifunctional heat-management elements may also be varied in different areas of the bodywear to balance the need for enhanced insulation properties in certain regions while preserving the functionality of the base fabric.

In various embodiments, the placement, pattern, and/or coverage ratio of the multilayered multifunctional heat-management elements may vary. Of course, the coverage locations and ratios can change depending on the type of garment. In some embodiments, the degree of coverage by the multilayered multifunctional heat-management elements may vary in a gradual fashion over the entire garment as needed. In various embodiments, the pattern of multilayered multifunctional heat-management elements may be symmetrical, ordered, random, and/or asymmetrical. Further, as discussed below, the pattern of multilayered multifunctional heat-management elements may be disposed on the exterior facing surface of a base fabric at strategic locations to improve the performance of the body wear. In various embodiments, the size of the multilayered multifunctional heat-management elements may also be varied to balance the need for enhanced insulation properties and to preserve the functionality of the base fabric.

EXAMPLES

In various embodiments, the heat-management material described herein may have superior heat-management and insulating characteristics as compared to other insulating materials that lack the heat-management material herein disclosed.

Figure 2:
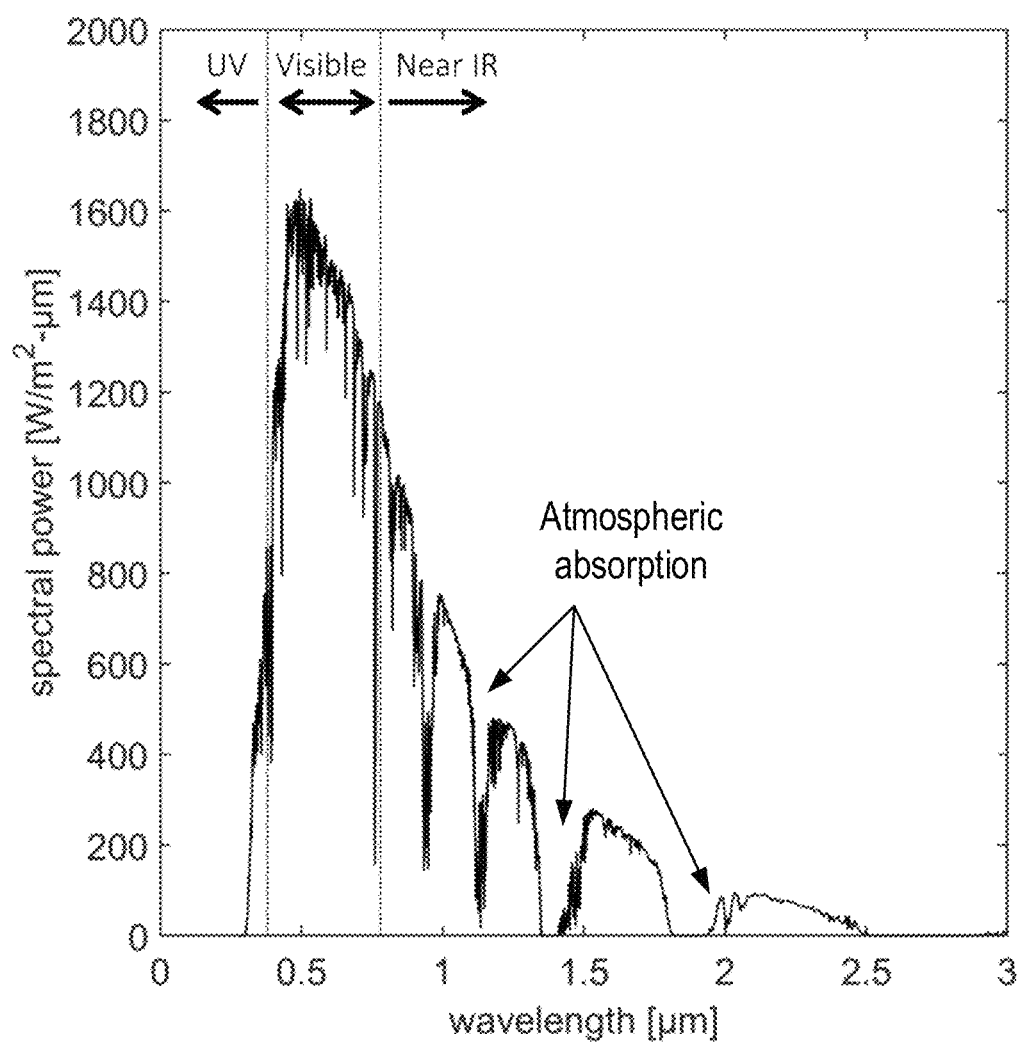
FIG. 2 is a graph of spectral power versus wavelength for solar radiation at the earth's surface, from the American Society for Testing and Materials (ASTM) G173.

ASTM G173 provides the solar spectrum at the earth's surface. The fraction of total solar power in the UV region is 3.2% (UVA and UVB, 0.28-0.38 µm), 53.4% in the visible region (0.38-0.78 µm), and 43.4% in the near IR region (0.78-3.0 µm). Effectively all solar energy is contained in wavelengths <2.5 µm (see FIG. 2).

Figure 3:
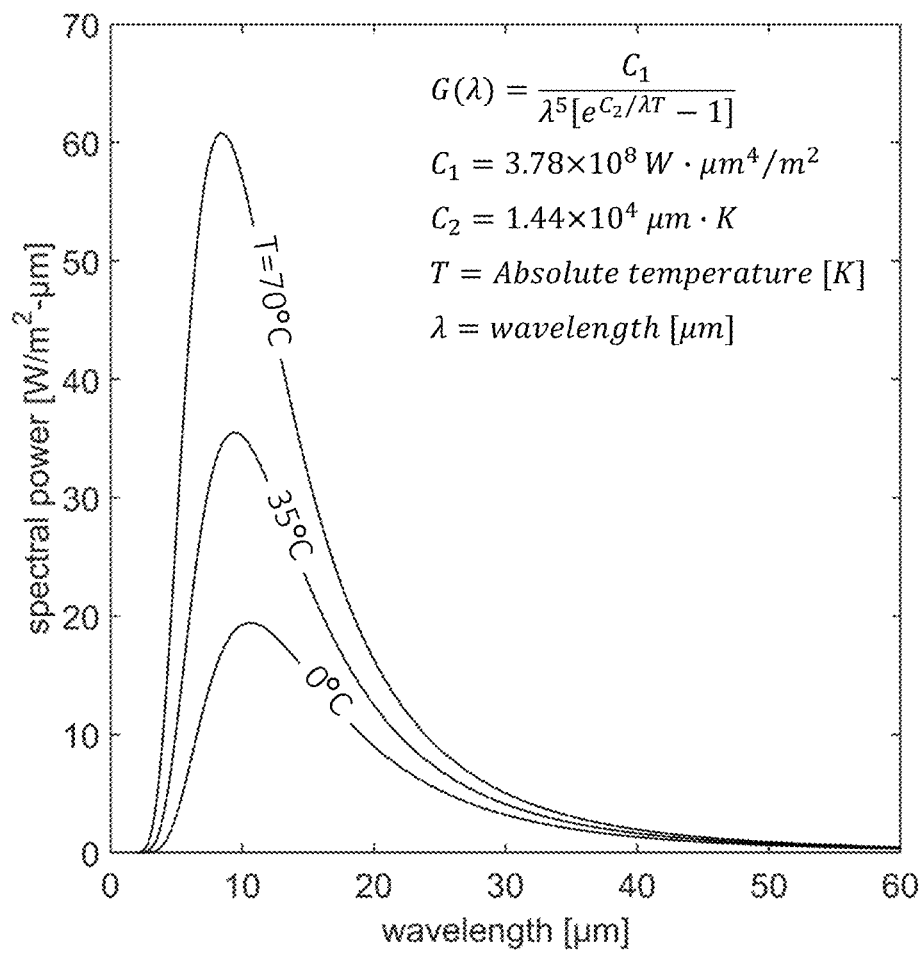
FIG. 3 is a graph of spectral power versus wavelength for thermal radiation emitted by a blackbody surface at typical surface temperatures, as given by a Planck distribution.

A Planck distribution provides the radiation emitted by a blackbody surface at a given absolute temperature (see FIG. 3): at typical surface temperatures (0-70° C.), peak emission is at ~10 µm. Surface emission is much less intense, but far broader than solar irradiation. At nominal skin temperature (35° C.), ca. 95% of the emitted energy by a blackbody is contained within the spectral region $5 \leq \lambda \leq 40$ µm.

Thermal emittance, or emissivity is a measure of an object's ability to emit radiant thermal energy. Values of emittance vary between 0 and 1. Metals tend to exhibit low thermal emittances and high thermal reflectances. Polymers tend to exhibit high thermal emittances and low thermal reflectances.

Figure 4:
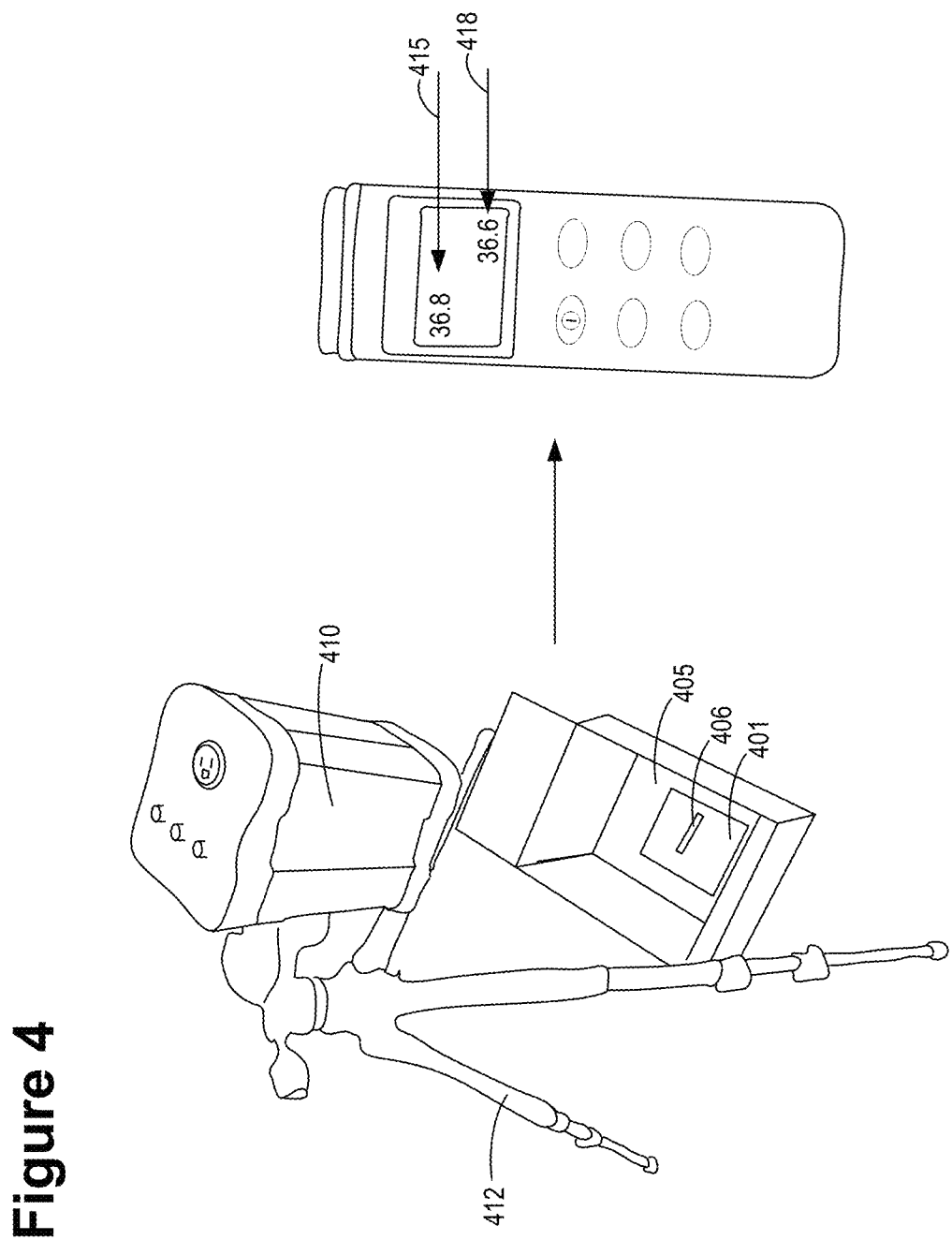
FIG. 4 shows the experimental set-up to thermally image and measure the temperature of a hotplate painted with a black polymeric coating, and a metal plate placed on its surface. The infrared (IR) thermal imaging camera measures the radiosity (i.e., the total amount of energy emitted, reflected and transmitted) from an object, which is then converted by the camera software into an apparent temperature using Planck's distribution for thermal radiation. The apparent temperature reading is only accurate when the user inputs the correct emissivity, or thermal emittance, of the object being measured into the camera's operating settings. Alternatively, an object held at a known actual temperature can be measured with an IR camera using an emittance setting of 1 (i.e., a perfect or 'blackbody' emitter); in this scenario, the degree to which the apparent temperature measured by the camera matches the actual temperature is an indicator of that object's thermal emittance.

For a given object, its measured emittance depends on the material characteristics of its surface. In fact, it is common practice to increase the emittance of a metal object by painting it black, because paint is a polymeric coating and black colorants typically absorb and emit more infrared thermal radiation than other colorants. This is demonstrated by the test shown in FIG. 4. A metal plate 401 was placed on a hotplate 405 that was painted black to create a high-emittance surface. A piece of high-emittance black electrical tape 406 (tape is a polymeric film with an adhesive layer) was placed on top of the metal plate 401. This set-up was imaged using an infrared (IR) thermal imaging camera 410 on a stand 412, which directly measures radiosity, which is generally proportional to thermal emittance. This radiosity is converted into temperature using the camera internal software according to Planck's distribution and the results are typically reported as temperatures, or apparent temperatures. For a given emittance setting on the IR camera, the thermal emittance of objects maintained at the same actual temperature will be proportional to their apparent temperature as measured by the camera. The hotplate was set to around 37° C. and a thermal image was measured. Thermocouples were used to ensure the temperatures of the hotplate (refer to arrow 415) and metal plate (refer to arrow 418) were approximately 37° C. (see FIG. 4).

Figure 5:
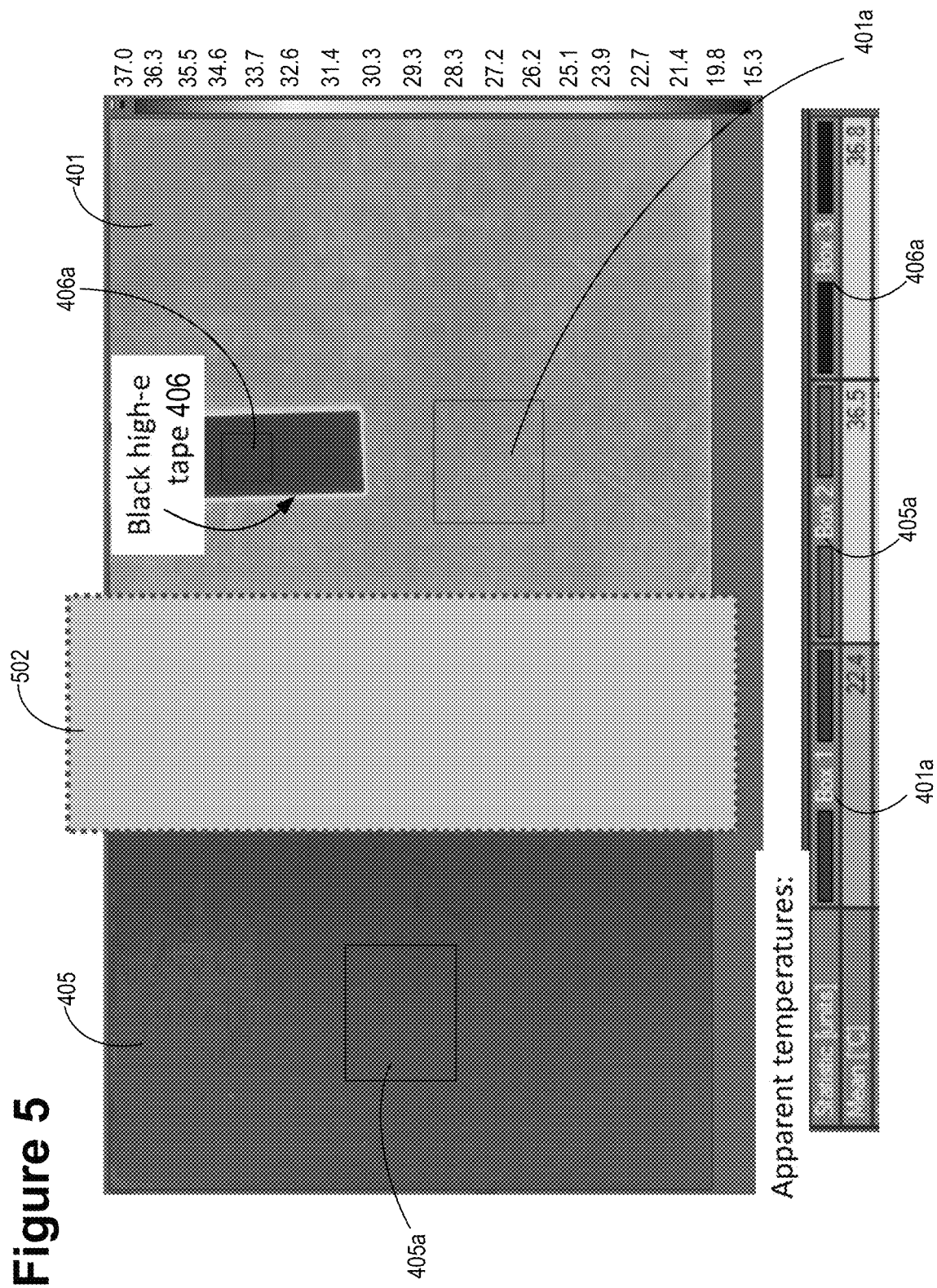
FIG. 5 illustrates results obtained from the thermal imaging set-up shown in FIG. 4.

The results of this test are shown in FIG. 5. An artefact region 502 is masked that is due to the reflection of the thermal camera (e.g., camera 410 at FIG. 4) on the metal plate 401 (note in FIG. 4 how the camera sits directly above the metal plate). The painted black hotplate 405 (corresponding to Box 2 405a) appears with an apparent temperature of 36.5° C., which is consistent with the actual temperature measured using the thermocouple. In contrast, the metal plate 401 (corresponding to Box 1 401a) appears with an apparent temperature of 22.4° C., which is much lower than the actual temperature measured using the thermocouple, indicating that the metal plate emits less radiant thermal energy than the black painted region. Thus, when the outermost surface of an object is metallic, the object is expected to exhibit low thermal emittance and retain more heat, as opposed to losing thermal energy via radiation to its surroundings. This is further demonstrated in FIG. 5 by placement of a small strip of black electrical tape 406, which is a thin polymeric film with an underlying adhesive layer, onto the metal plate 401. The apparent temperature of the black electrical tape (corresponding to Box 3 406a) is 36.8° C., which is also consistent with the actual temperature of the metal plate measured using the thermocouple. When the outermost surface of an object is polymeric, the object is expected to exhibit high thermal emittance, which leads to larger radiative heat losses.

As shown in FIGS. 6, 7, 9, and 10, heat-management elements (FIG. 6 and FIG. 7) and heat-management elements coupled to fabric surfaces (FIG. 9 and FIG. 10) were tested to measure thermal emittance and solar absorptance. Spectral measurements in the solar range, constituting the ultraviolet, visible, and near IR (UV/Vis/NIR) wavelength range (0.25<λ<2.5 μm), were conducted using a Laboratory Portable SpectroReflectometer (LPSR) 300 spectrophotometer, in general accordance with ASTM E903. Spectral measurements from 2.5-40 μm, constituting the mid IR (MIR) thermal range, were conducted using a Nicolet iS50 Fourier-transform infrared (FTIR) spectrophotometer with a Pike Upward MID integrating sphere, in general accordance with ASTM E408. The average spot size for each measurement: rectangular spot ca. 7.6 mm×2 mm for UV/Vis/NIR (0.25-2.5 μm); elliptical spot ca. 8.5 mm×7.5 mm for MIR (2.5-40 μm). In both instruments, the measurement spot size was determined to be sufficiently large relative to the heat-management elements when applied to a fabric surface that the measurement represented an average of the spectral response for the multi-material (i.e., fibers and elements) fabric surface. This was verified by considering the deviation between measurements from three samples taken in different positions in each instrument. Heat-management elements were measured on card stock.

Reflectance and transmittance measurements were conducted. Since energy conservation dictates that reflectance (ρ(λ))+transmittance (τ(λ))+absorptance (α(λ))=1, the absorptance of an object can be calculated from its measured spectral reflectance and transmittance. By Kirchoff's law, spectral emittance (ε(λ)) is equal to the spectral absorptance (α(λ)). The fabrics and card stock are nominally opaque (i.e., τ=0) for 5≤λ≤40 μm; therefore α(λ)=1−ρ(λ), =ε(λ).

The weighted average thermal emittance can be calculated:

$$\bar{\varepsilon} = \frac{\int \varepsilon(\lambda) \cdot G(\lambda) \cdot d\lambda}{\int G(\lambda) \cdot d\lambda} \quad (4)$$

where G(λ) is the Planck blackbody distribution at 35° C.

The weighted average solar absorptance can be calculated:

$$\bar{\alpha} = \frac{\int \alpha(\lambda) \cdot G(\lambda) \cdot d\lambda}{\int G(\lambda) \cdot d\lambda} \quad (5)$$

where G(λ) is the solar spectrum given by ASTM G173.

Referring to FIGS. 6, 7, 9, and 10, the samples comprising multilayered heat-management elements in which a thin black polymeric layer is the outermost layer overlying a thin metallic layer lead to lower thermal emittance than a purely black polymeric heat-management element. This was an unexpected and surprising result.

Figure 6:
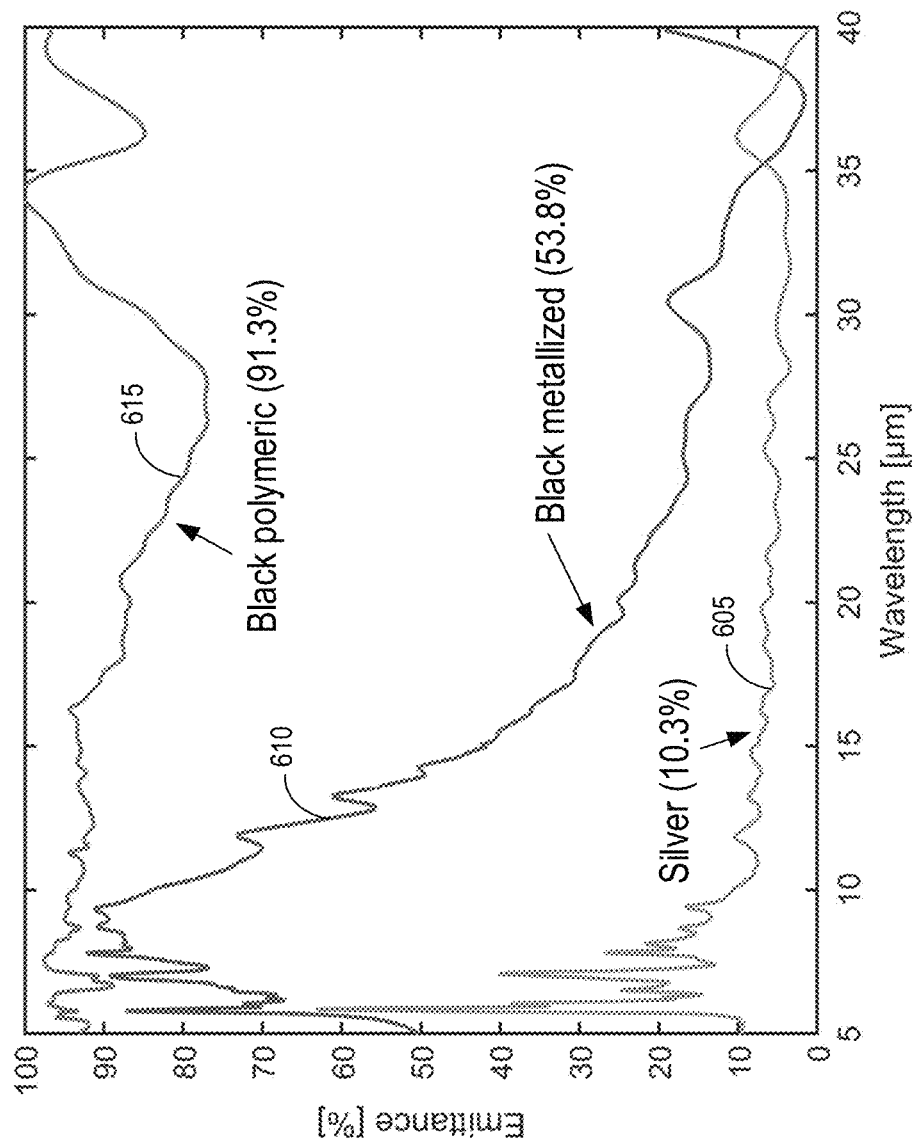
FIG. 6 illustrates the thermal emittance versus wavelength for three different heat-management elements: silver, multilayered multifunctional heat-management elements of the present disclosure (e.g., black metallized), and black polymeric. The percentages are weighted average emittances, $\bar{\varepsilon}$.

Specifically, FIG. 6 depicts thermal emittance versus wavelength of various heat management elements, including a silver heat-management element (line 605) (e.g., where the high solar absorptance layer lacks a colorant), a multilayered multifunctional heat-management element of the present disclosure (line 610), and a black polymeric heat-management element (line 615) (e.g., pure black polymeric heat-management element lacking metal). In the example shown at FIG. 6, the multilayered multifunctional heat-management element (line 610) comprised a black metallic multilayered multifunctional heat-management element. Specifically, the low emittance layer (e.g., low emittance layer 16 at FIG. 1) comprised a metal and the high solar absorptance layer (e.g., high solar absorptance layer 18 at FIG. 1) comprised a black colorant in a polymeric overlayer. The silver heat-management element (line 605) exhibited a weighted average thermal emittance of 10.3%, the black metallic multilayered multifunctional heat-management element (line 610) exhibited a weighted average thermal emittance of 53.8%, and the black polymeric heat-management element (line 615) exhibited a weighted average thermal emittance of 91.3%.

Figure 7:
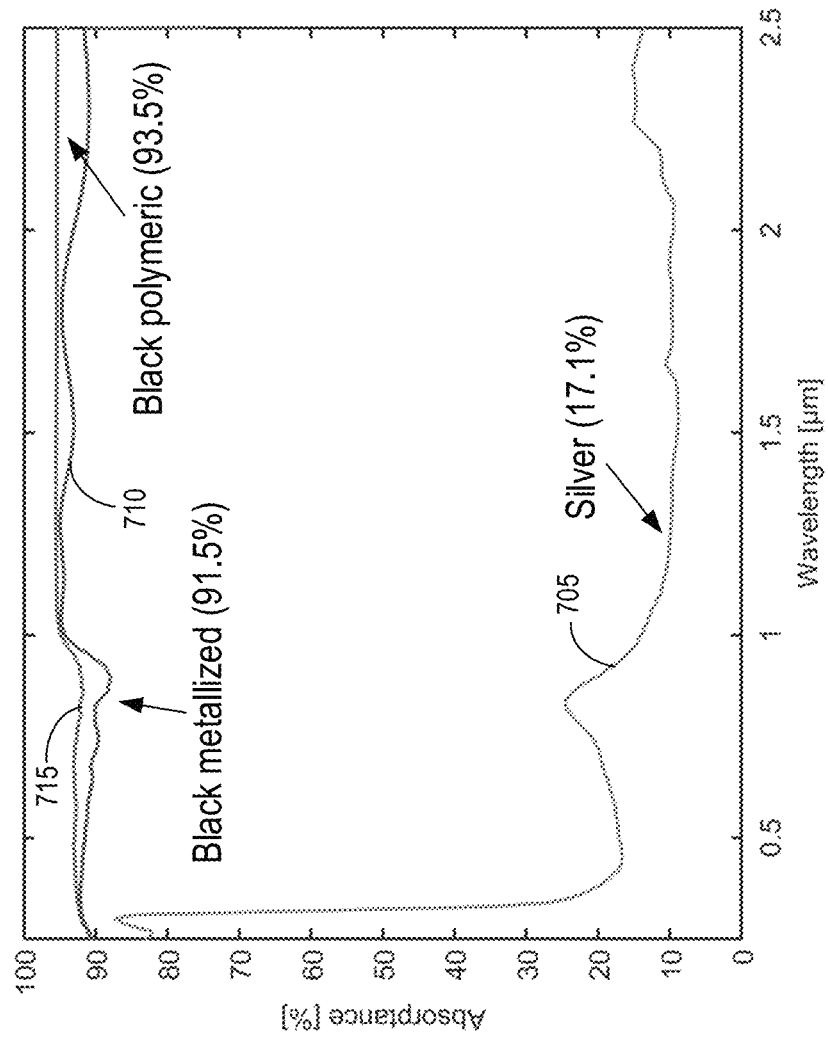
FIG. 7 illustrates the solar absorptance versus wavelength for three different heat-management elements: silver, multilayered multifunctional heat-management elements of the present disclosure (e.g., black metallized), and black polymeric. The percentages are weighted average absorptances, $\bar{a}$.
Figure 8:
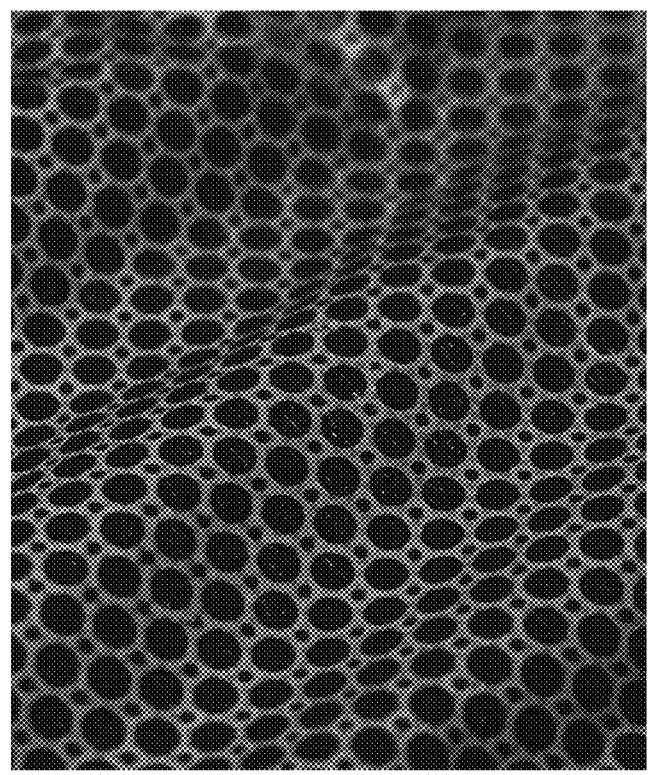
FIG. 8 is a digital image of an embodiment in which multilayered multifunctional heat-management elements of the present disclosure (e.g., black metallized) have been applied to a fabric surface.

FIG. 7 depicts solar absorptance versus wavelength of the various heat-management elements discussed above with regard to FIG. 6, including the silver heat-management elements (line 705), multilayered multifunctional heat-management element (line 710) and black polymeric heat-management element (line 715). Similar to that discussed above with regard to FIG. 6, the multifunctional heat-management element comprised a black metallic multilayered multifunctional heat-management element. The silver heat-management element (line 705) exhibited a weighted average absorptance of 17.1%, the multilayered multifunctional heat-management element (line 710) exhibited a weighted average absorptance of 91.5%, and the black polymeric heat-management element (line 715) exhibited a weighted average thermal emittance of 93.5%.

Figure 9:
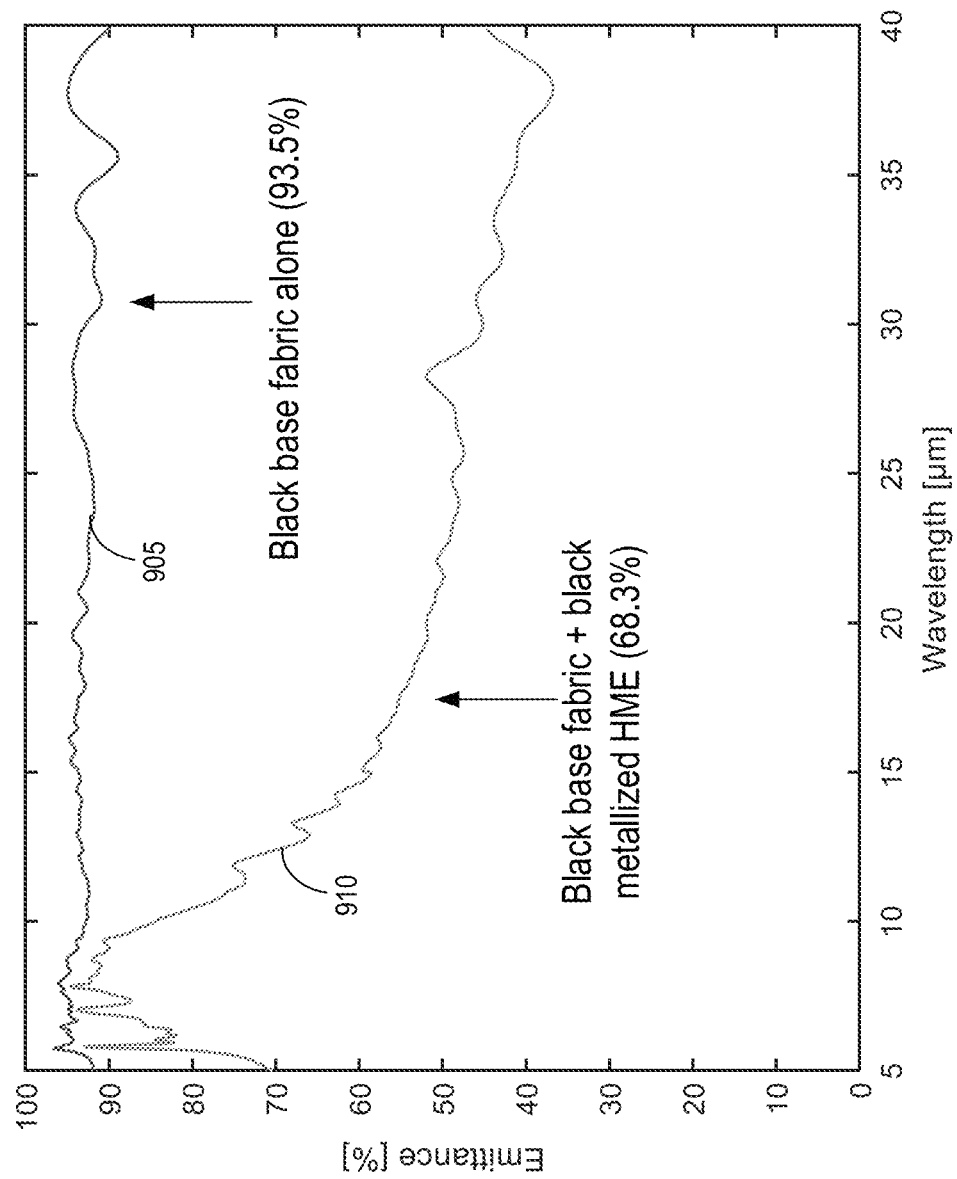
FIG. 9 illustrates the thermal emittance versus wavelength for two different fabrics: black base fabric, and the same black base fabric onto which multilayered multifunctional heat-management elements of the present disclosure (e.g., black metallized) are coupled and cover 55% of the surface. The percentages are weighted average emittances, $\bar{\varepsilon}$.

FIG. 9 illustrates the thermal emittance versus wavelength for two different fabrics: a black base fabric (line 905) and the same black base fabric onto which multilayered multifunctional heat-management elements of the present disclosure (line 910) are coupled and which cover 55% of the surface. With reference to FIG. 9, the multifunctional heat-management elements comprised a black metallic multilayered multifunctional heat-management element, similar to that discussed above with regard to FIG. 6 and FIG. 7. The black base fabric (line 905) lacking the multifunctional heat-management elements exhibited a weighted average emittance of 93.5%. The black base fabric onto which multilayered multifunctional heat-management elements (line 910) were coupled exhibited a weighted average emittance of 68.3%.

Figure 10:
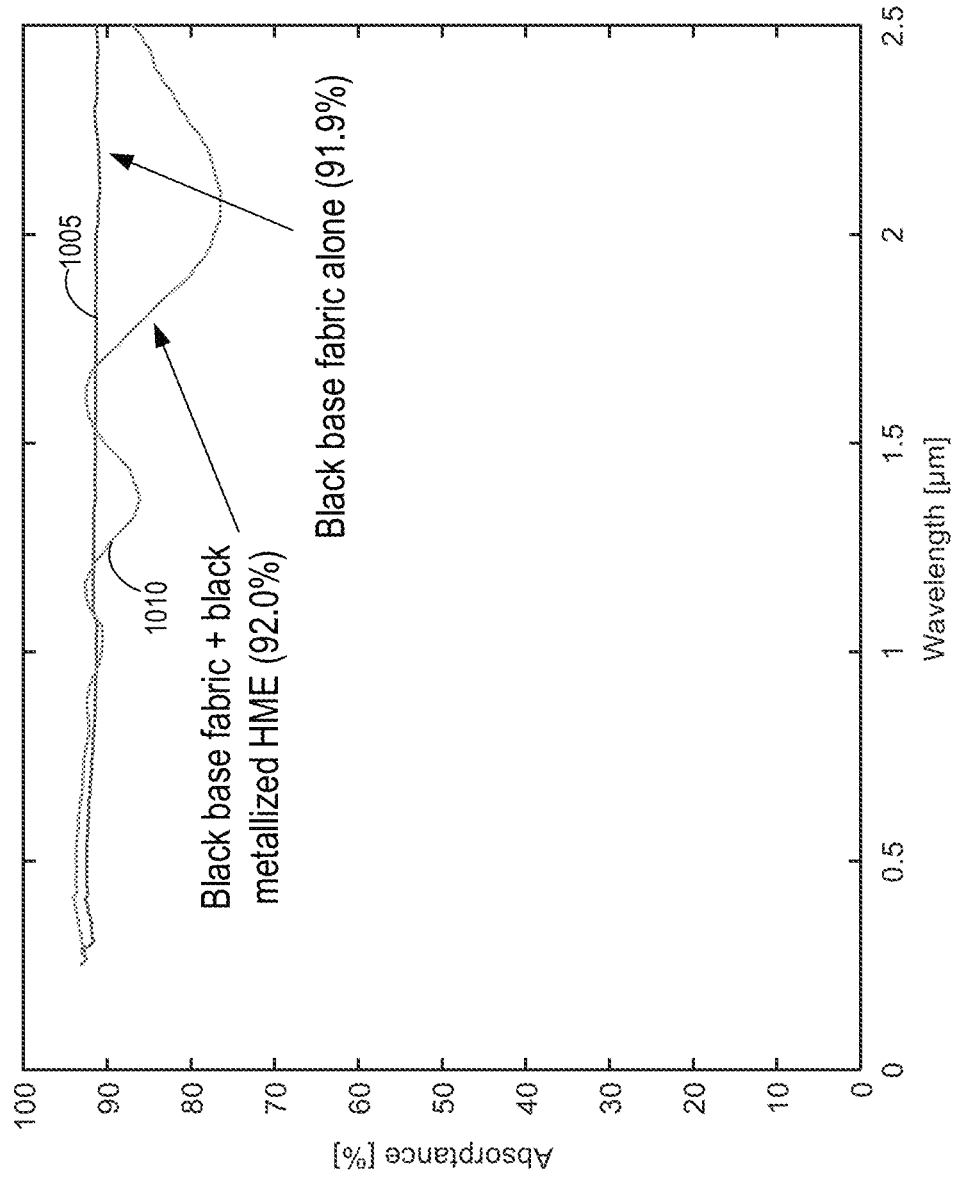
FIG. 10 illustrates the solar absorptance versus wavelength for two different fabrics: black base fabric, and the same black base fabric onto which multilayered multifunctional heat-management elements of the present disclosure (e.g., black metallized) are coupled and cover 55% of the surface. The percentages are weighted average absorptances, $\bar{a}$.

FIG. 10 illustrates the solar absorptance versus wavelength for the two different fabrics discussed above with regard to FIG. 9, specifically, the black base fabric (line 1005) and the same black base fabric onto which multilayered multifunctional heat-management elements of the present disclosure are coupled (line 1010) and cover 55% of the surface. The black base fabric (line 1005) lacking the multifunctional heat-management elements exhibited a weighted average absorptance of 91.9%. The black base fabric onto which multilayered multifunctional heat-management elements (line 1010) were coupled exhibited a weighted average absorptance of 92.0%.

Thermal resistance was measured using a standard hot-plate method in general accordance with ASTM F-1868, Part A: Dry Heat Transport, under the following conditions: $T_{plate}$=35° C., $T_{ambient}$=20° C., relative humidity=65%, and air velocity=1 m/s. Results for six different fabrics with silver foil laminated to the fabric surface are shown in Table 1. For each fabric, the thermal resistance is significantly greater when the silver foil is on the outermost surface of the fabric, facing away from the heat source. The thermal resistance is also greater, for a given fabric, when the silver foil surface coverage is greater.

TABLE 1

Thermal resistance (clo) of fabrics with silver heat-management element (HME) laminated to the fabric surface showing increase with HME facing up, away from the heat source.

| Fabric description | Weight (gsm) | Thermal resistance (clo) | Thermal resistance, foil up (clo) | Thermal resistance increase |
|---|---|---|---|---|
| 30% Silver on Jersey Knit | 173 | 0.115 | 0.138 | 20% |
| 30% Silver on Lite Lining | 57 | 0.033 | 0.055 | 67% |
| 30% Silver on Interlock | 147 | 0.079 | 0.103 | 31% |
| 55% Silver on Jersey Knit | 176 | 0.103 | 0.154 | 50% |
| 55% Silver on Lite Lining | 58 | 0.052 | 0.091 | 76% |
| 55% Silver on Interlock | 151 | 0.086 | 0.132 | 54% |

TABLE 2

Thermal resistance (clo) of fabrics with multilayered black heat-management element laminated to the fabric surface showing increase with multilayered multifunctional black heat-management element facing up, away from the heat source. Solar fraction incident on fabric surface is zero.

| Fabric description | Weight (gsm) | Thermal resistance (clo) | Thermal resistance, foil up (clo) | Thermal resistance increase |
|---|---|---|---|---|
| 55% Black on Lite Shell | 63 | 0.082 | 0.095 | 15% |
| 55% Black on Double Weave | 85 | 0.0063 | 0.0080 | 27% |
| 55% Black on Lt Wt ODX | 64 | 0.0103 | 0.0138 | 34% |
| 55% Black on Matte Dry | 88 | 0.0055 | 0.0095 | 73% |

Multilayered heat-management elements of the present disclosure on a fabric in which a thin polymeric layer (e.g., thin black polymeric layer) is the outermost layer leads to increased heat retention. This is an unexpected and surprising result. In addition to leading to increased heat retention over the base fabric when there is no incident solar radiation, further results indicate even more increased heat retention when solar radiation adds to the heat load due to absorptance by the black outer layer and conduction into the heat-management material.

Figure 11A:
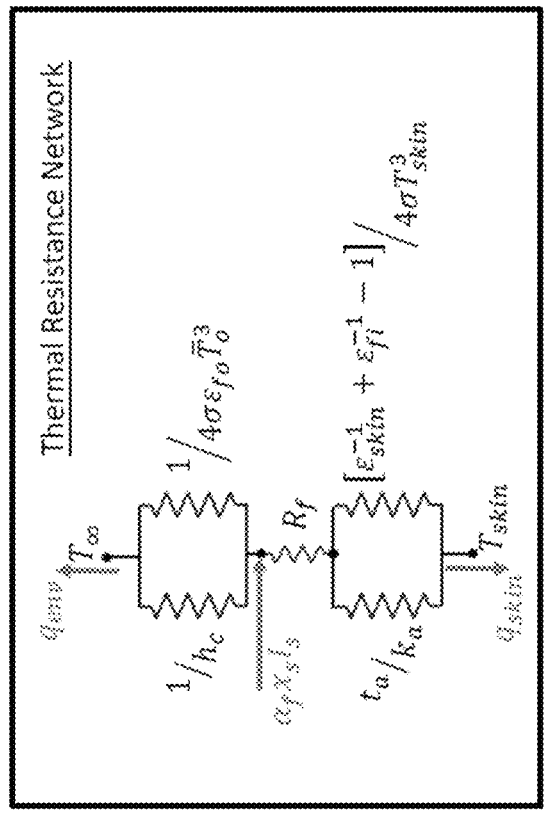
FIGS. 11A-11B depict a schematic model (FIG. 11A) and thermal resistance network (FIG. 11B) developed to determine effect of material and environmental parameters on the relative importance of thermal emittance and solar absorptance for a textile fabric in retaining heat.
Figure 11B:
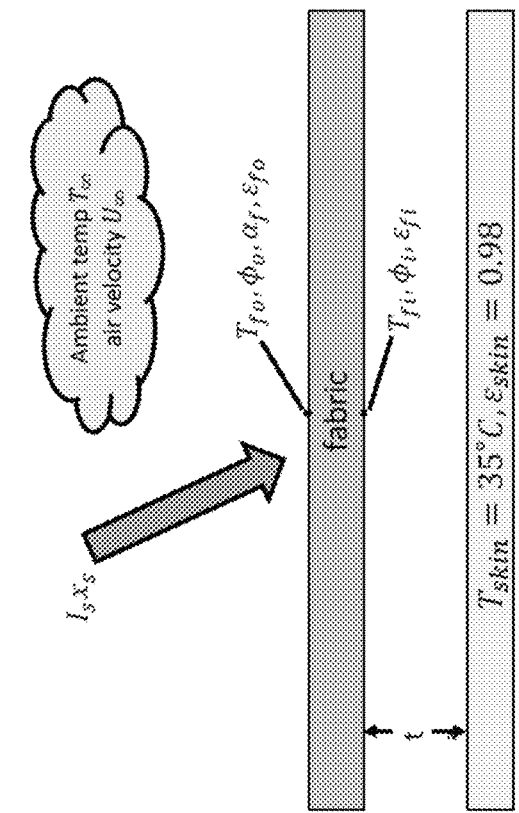
Figure 12:
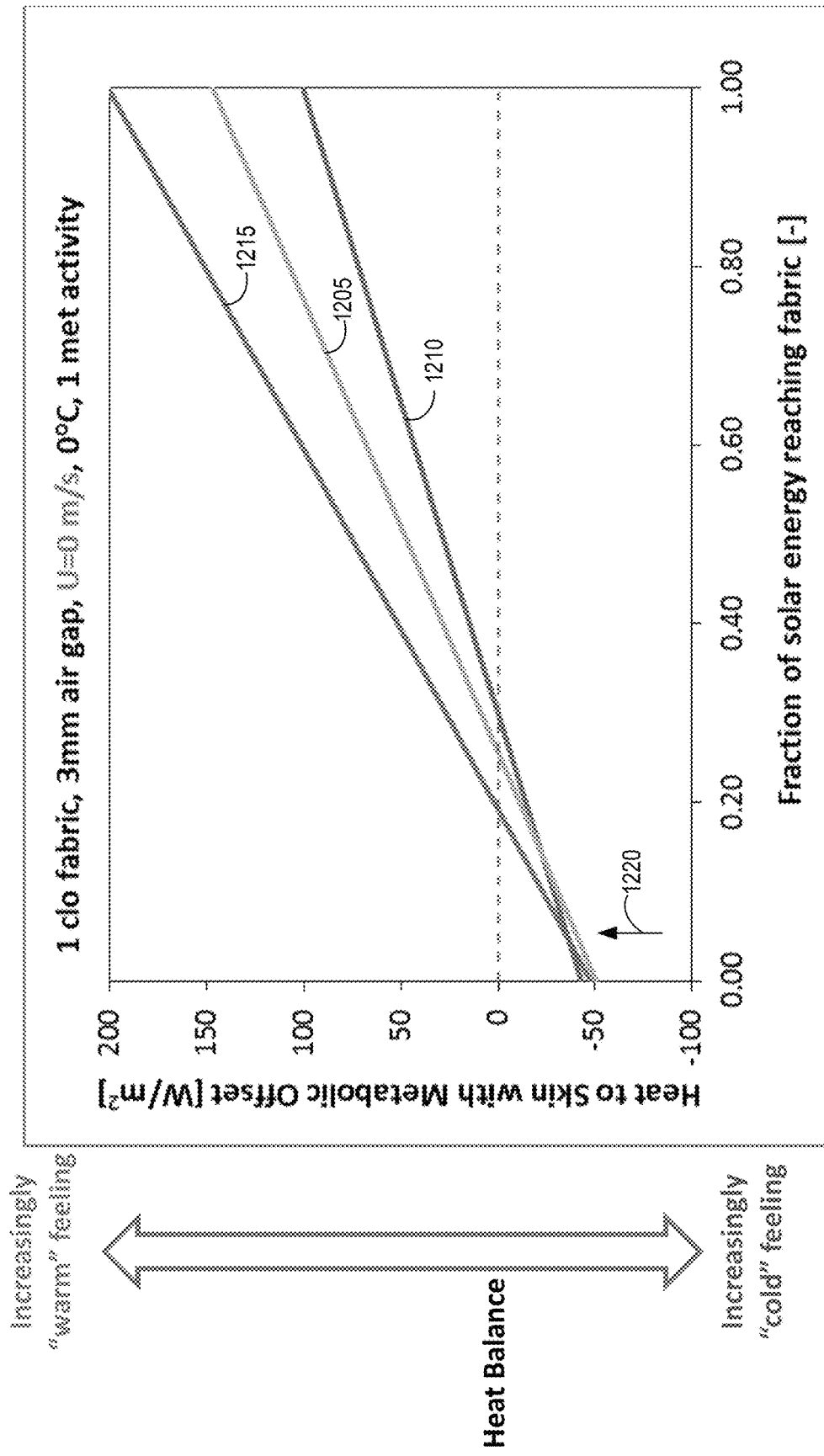
FIG. 12 illustrates the heat-to-skin versus fraction of solar energy reaching fabric determined from thermal modeling of three different textile fabrics: black base fabric, the same black base fabric with 50% silver heat-management elements on the outermost surface, and the same black base fabric with 50% multilayered multifunctional heat-management elements of the present disclosure on the outermost surface. The fixed material and environmental parameters are shown at the top of the plot.

A thermal model (FIG. 11A) and thermal resistance network (FIG. 11B) were developed to determine the effect of material and environmental parameters on the relative importance of thermal emittance and solar absorptance for a textile fabric in retaining heat. The variable parameters in the model include the following: fabric surface thermal emittance, fabric surface solar absorptance, fabric thermal resistance, air gap between fabric and skin, ambient temperature, incident solar fraction (i.e., the percentage of the sun's radiant energy that reaches the surface of the garment), air velocity, and activity level. Some results of the thermal modeling are shown in FIG. 12 as heat-to-skin versus fraction of solar energy reaching fabric for three different fabrics: black base fabric (line 1205), the same black base fabric with 50% silver heat-management elements on the outermost surface (line 1210), and the same black base fabric with 50% multilayered black heat-management elements of the present disclosure on the outermost surface (line 1215). At zero solar fraction reaching the fabric, the fabric with silver heat-management elements on the outermost surface retains the most heat. This is consistent with the thermal resistance measurements (see Table 1). However, for solar fractions above about 3% (depicted illustratively by arrow 1220), the fabric with the multilayered black heat-management elements on the outermost surface retains the most heat. Throughout the entire solar fraction range, from no sunlight at all to maximum sunlight, the fabric with the multilayered multifunctional black heat-management elements on the outermost surface retains more heat than the black fabric alone. This is consistent with the low emittance, high solar absorptance multifunctional nature of the multi-layered heat-management elements, and consistent with thermal resistance measurements (see Table 2 and FIG. 12).

Figure 13:
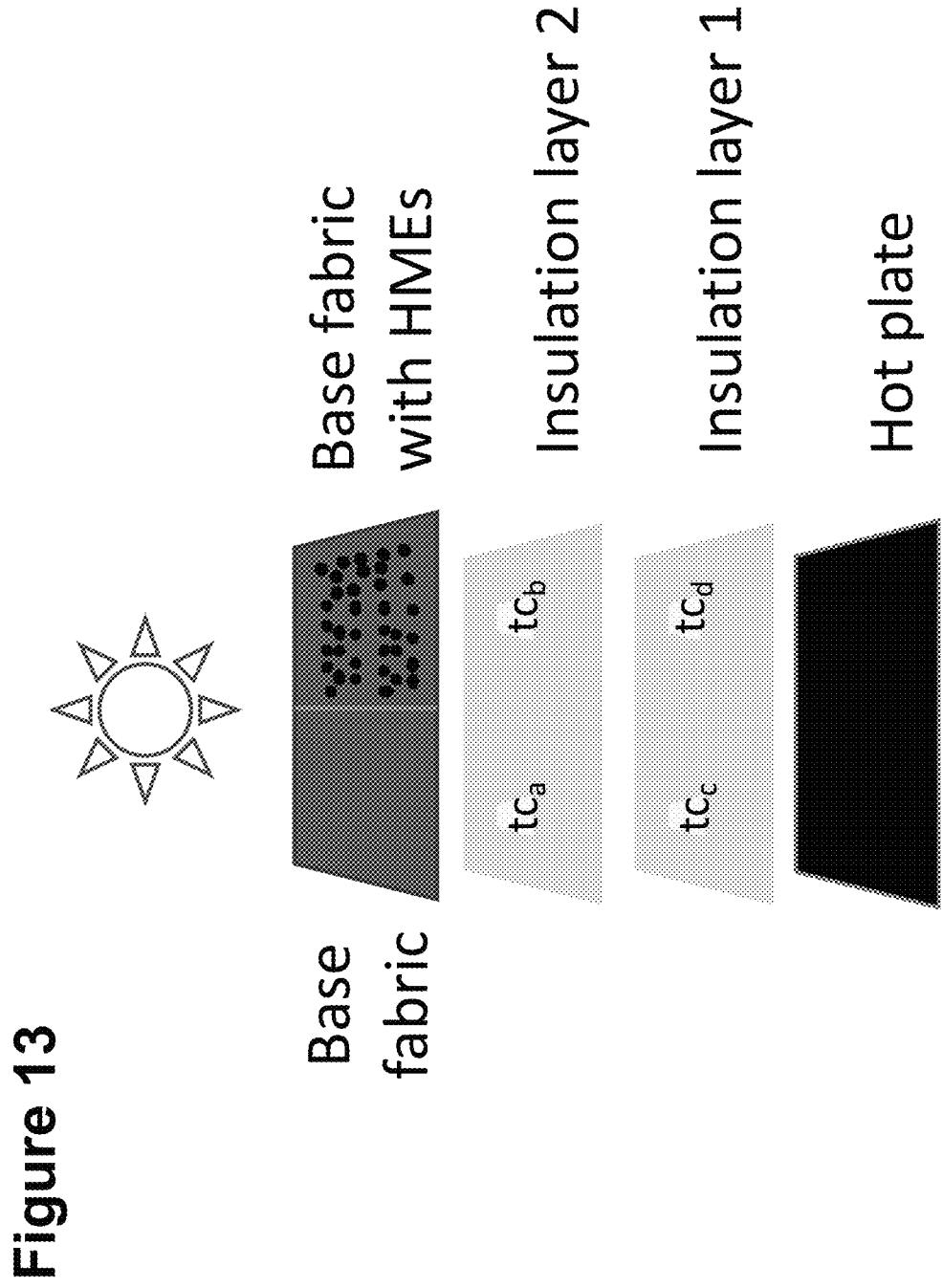
FIG. 13 illustrates a schematic set-up of an experiment conducted to determine heat trapped by a fabric.

FIG. 13 illustrates a schematic set-up of an experiment conducted to determine heat trapped by a black base fabric and the same black base fabric onto which multilayered multifunctional heat-management elements (HMEs, depicted as black dots at FIG. 13) are coupled and cover 55% of the surface. The two fabrics are placed side-by-side on top of two layers of fibrous insulation (80 gsm per layer). Thermocouples (tc) were placed under each fabric (tc$_a$ and tc$_b$), and between the two layers of insulation (tc$_c$ and tc$_d$). The hot plate was set near core body temperature (37° C.) and the entire set-up was placed in a cold room at 4° C. A Sunlite ENH 250-watt/MR16 clear bulb, designated by the sun in the schematic and used to simulate solar radiation, was placed about 23 cm above the fabric surfaces.

Figure 14:
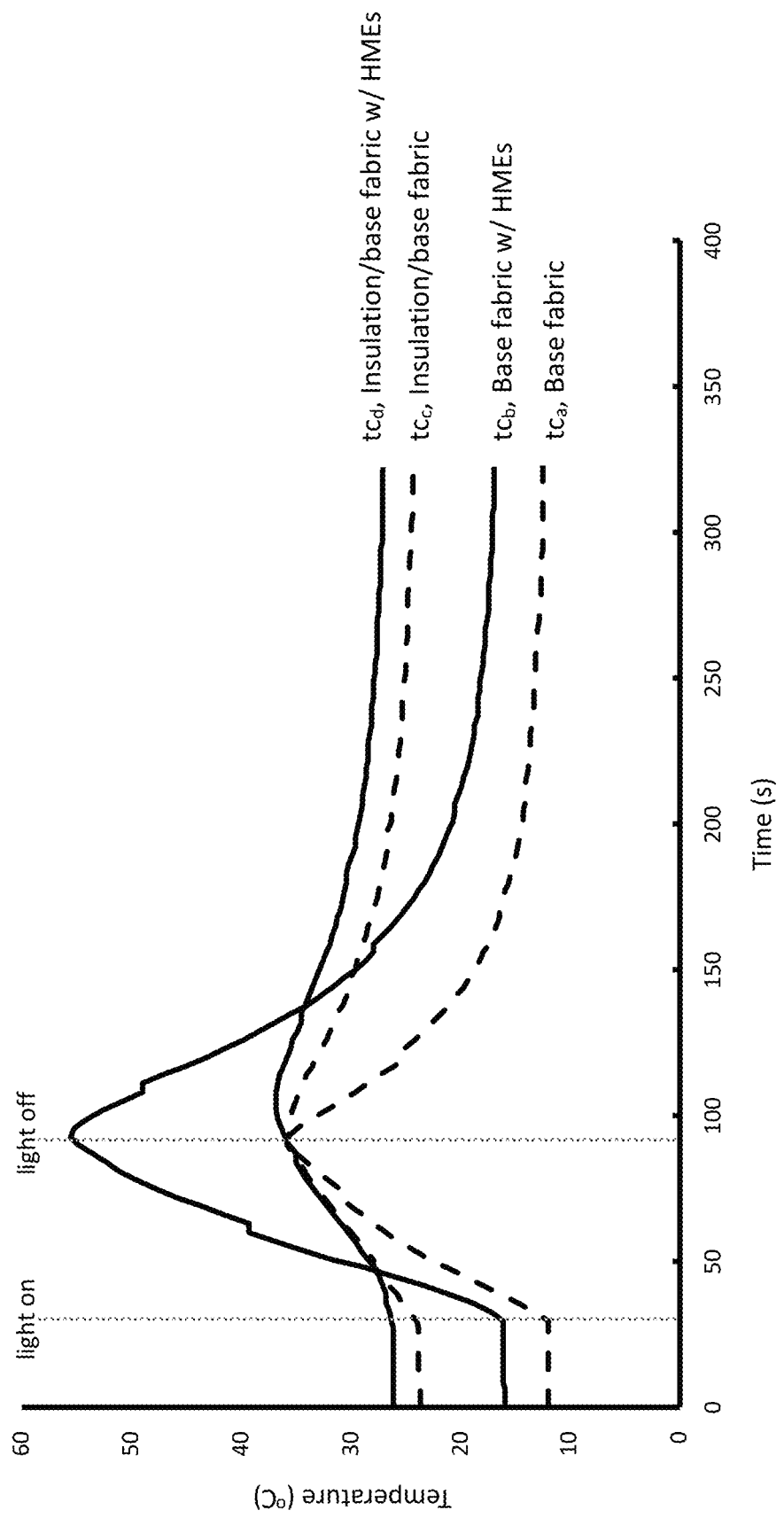
FIG. 14 is a graph of the data collected using the experimental set-up shown in FIG. 13.
Figure 15A:
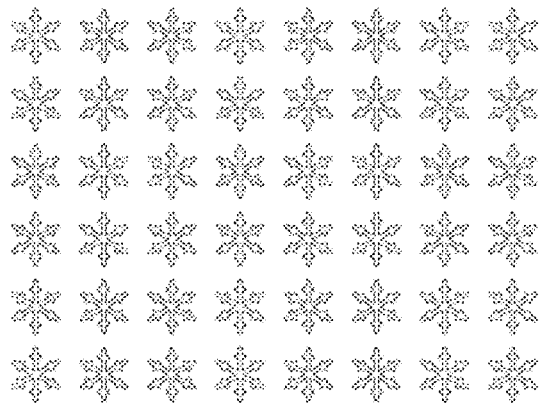
FIGS. 15A-15H illustrate examples of discontinuous patterned multilayered multifunctional heat-management elements disposed on the exterior facing surface of a base fabric, in accordance with various embodiments.
Figure 15B:
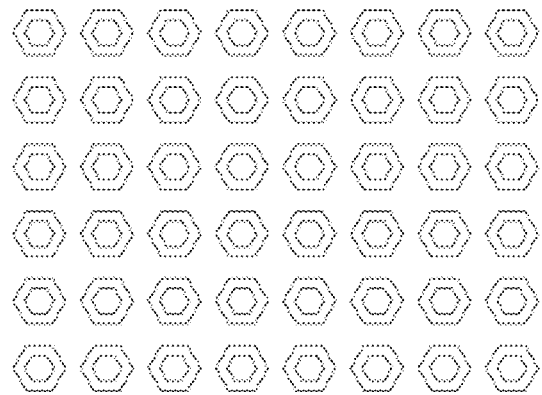
Figure 15C:
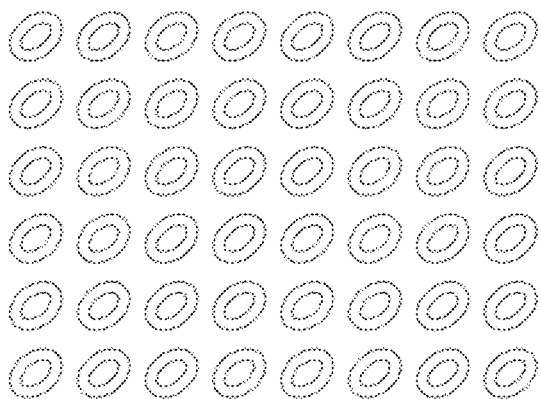
Figure 15D:
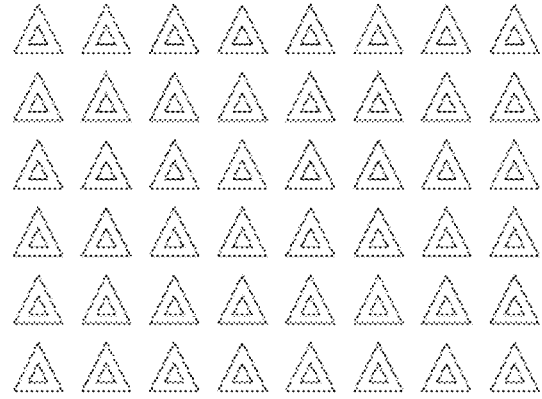
Figure 15E:
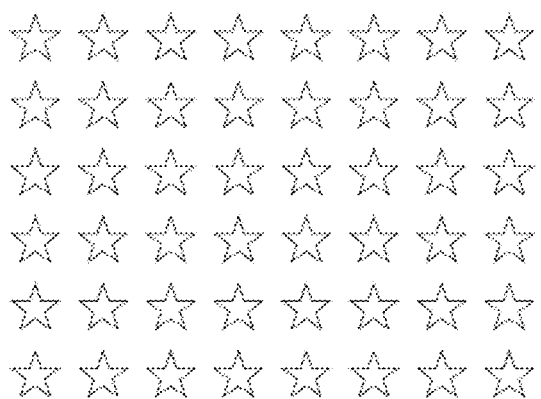
Figure 15F:
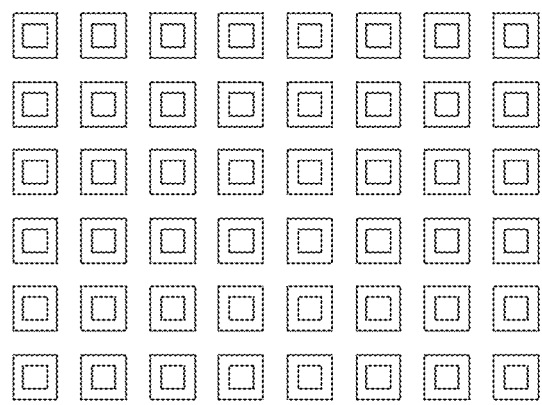
Figure 15G:
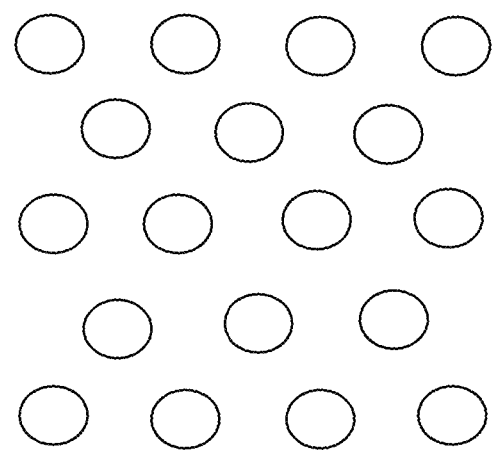
Figure 15H:
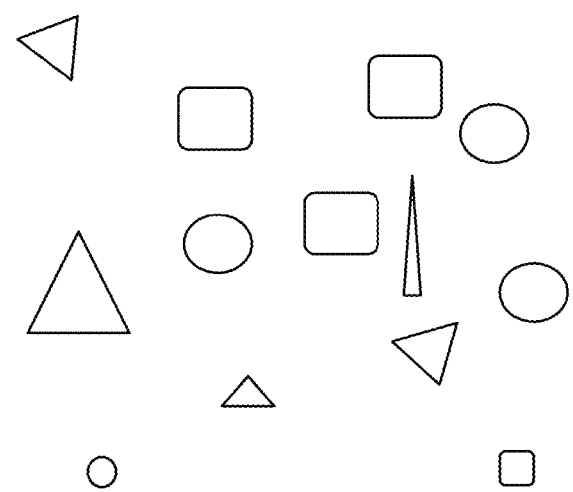
Figure 16A:
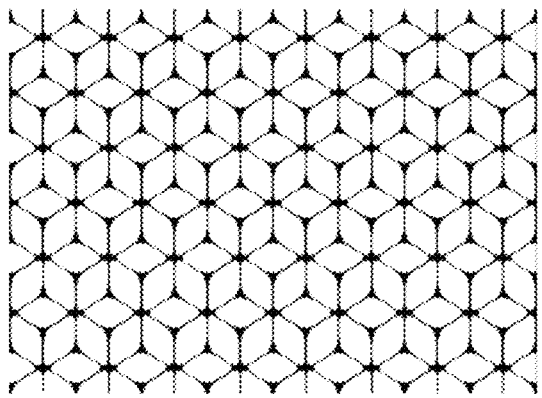
FIGS. 16A-16F illustrate examples of patterned multilayered multifunctional heat-management elements disposed on the exterior facing surface of a base fabric, in accordance with various embodiments.
Figure 16B:
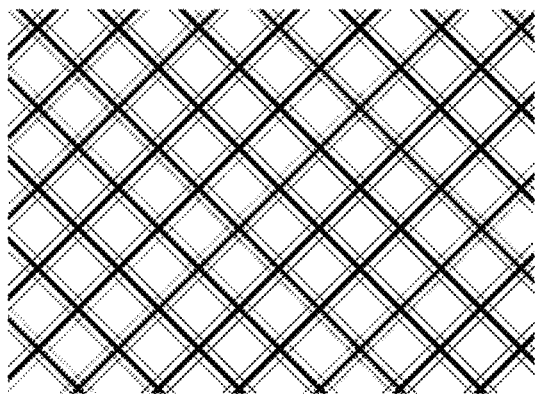
Figure 16C:
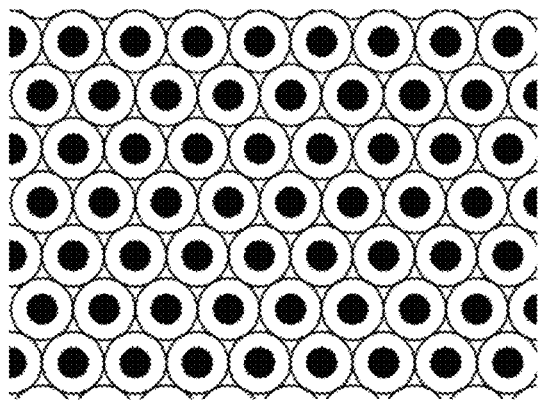
Figure 16D:
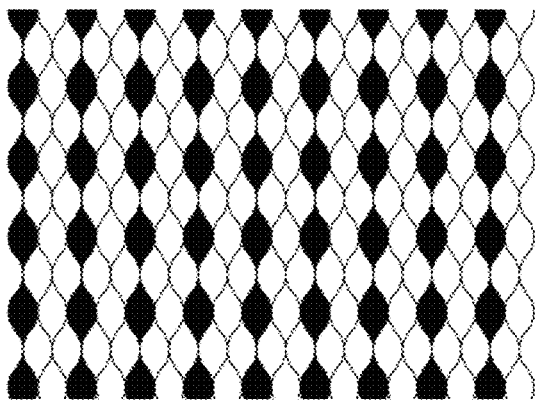
Figure 16E:
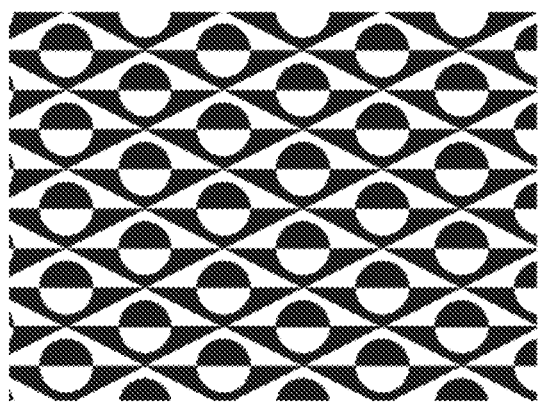
Figure 16F:
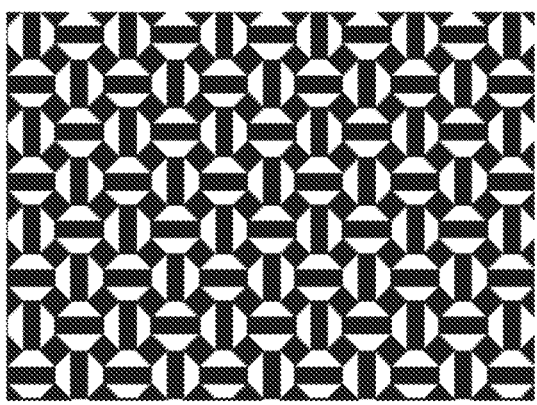

FIG. 14 is a graph of the data collected using the experimental set-up shown in FIG. 13. Before exposure to simulated solar radiation, steady-state temperatures are higher under the base fabric with multilayered multifunctional heat-management elements (HMEs) even within the insulation layers, than the steady-state temperatures under the same base fabric without HMEs. This result demonstrates that more heat is trapped under the fabric with HMEs. After the turning the light on to simulate exposure to solar radiation, the temperatures rise higher under the base fabric with HMEs, even within the insulation layers, than they do under the same base fabric without HMEs. Furthermore, after the light is turned off, the heat absorbed and conducted into the fabric/insulation stack is held longer under the base fabric with HMEs, even within the insulation layers, than the heat absorbed and conducted under the same base fabric without HMEs. This was a surprising result in light of the fact that the solar absorptance values for the black HMEs and black fabric are approximately the same. These results reveal that the HMEs function, surprisingly, as solar collectors that absorb more heat, conduct it into the material, and hold it longer than a base fabric characterized by a similar solar absorptance.

Thus, discussed herein in an embodiment is a heat-management material, comprising a base fabric having an externally facing surface and an internally facing surface, and a plurality of multilayered multifunctional heat-management elements coupled to the externally facing surface of the base material. In an example, each of the plurality of multilayered multifunctional heat-management elements may comprise a low thermal emittance layer, and a high solar absorptance layer, wherein the heat-management material has a weighted average thermal emittance of less than 0.8.

In another embodiment, an article of bodywear comprises a heat-management material, the heat-management material having a base fabric having an externally facing surface and an internally facing surface, and a plurality of multilayered multifunctional heat-management elements coupled to the externally facing surface of the base material. In such an example, each of the plurality of multilayered multifunctional heat-management elements may comprise a low thermal emittance layer, and a high solar absorptance layer, wherein the heat-management material has a weighted average thermal emittance of less than 0.8.

In yet another embodiment, a method of making a heat-management material comprises selecting a base fabric having an externally facing surface and an internally facing surface, and coupling one or more multilayered multifunctional heat-management elements to the externally facing surface of the base fabric. In such an example, each of the one or more multilayered multifunctional heat-management elements may comprise a low thermal emittance layer, and a high solar absorptance layer.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A heat-retention material, comprising:
    a base fabric having an externally facing surface and an internally facing surface; and
    a plurality of individualized multilayered multifunctional heat-retention elements disposed discontinuously on the externally facing surface of the base fabric, wherein placement and spacing of the plurality of individualized multilayered multifunctional heat-retention elements leaves a portion of the base fabric uncovered between the elements, each of the plurality of multilayered multifunctional heat-retention elements comprising:
        a low thermal emittance layer directly attached to the base fabric, wherein the low thermal emittance layer restricts heat transmission outward through the externally facing surface of the base fabric; and
        a high solar absorptance layer disposed on top of the low thermal emittance layer to form an outermost surface of the multilayered multifunctional heat-retention elements, wherein the high solar absorptance layer comprises a polymeric overlayer that traps solar radiation, and wherein the polymeric overlayer comprises a colorant that increases the solar absorption of the high solar absorptance layer,
    wherein the heat-retention material has a weighted average thermal emittance that is between 0.1 and 0.8.

2. The heat-retention material of claim 1, wherein the heat-retention material has a weighted average solar absorptance of at least 0.5.

3. The heat-retention material of claim 1, wherein the low thermal emittance layer is a metallic foil.

4. The heat-retention material of claim 3, wherein the metallic foil is aluminum.

5. The heat-retention material of claim 1, wherein the low thermal emittance layer has a thickness of 5 nm to 100 nm.

6. The heat-retention material of claim 5, wherein the thickness of the low thermal emittance layer is 30-50 nm.

7. The heat-retention material of claim 1, wherein the high solar absorptance layer has a thickness of 0.1 μm to 10.0 μm.

8. The heat-retention material of claim 7, wherein the thickness of the high solar absorptance layer is 1.0-1.4 μm.

9. The heat-retention material of claim 1, wherein the colorant is a black colorant.

10. The heat-retention material of claim 1, wherein the colorant is a photochromic colorant that turns from clear to colored upon light exposure.

11. The heat-retention material of claim 1, wherein a surface coverage area of the plurality of multilayered multifunctional heat-retention elements is about 5% to about 95% of the externally facing surface of the base fabric in at least one 1 inch by 1 inch unit cell.

12. The heat-retention material of claim 1, wherein a surface coverage area of the plurality of multilayered multifunctional heat-retention elements varies across different regions of the heat-retention material.

13. The heat-retention material of claim 1, wherein each of the plurality of multilayered multifunctional heat-retention elements are 0.1 mm in diameter to 10.0 mm in diameter.

14. The heat-retention material of claim 1, wherein the heat-retention material is part of a coat, jacket, shoe, boot, slipper, glove, mitten, hat, scarf, pants, sock, tent, backpack, sleeping bag, blanket, shirt, footwear, or pullover.

15. An article of bodywear comprising:
    a heat-retention material, the heat-retention material having:
        a base fabric having an externally facing surface and an internally facing surface; and
        a plurality of individualized multilayered multifunctional heat-retention elements disposed discontinuously on the externally facing surface of the base fabric, wherein placement and spacing of the plurality of individualized multilayered multifunctional heat-retention elements leaves a portion of the base fabric uncovered between the elements, each of the plurality of multilayered multifunctional heat-retention elements comprising:
            a low thermal emittance layer directly attached to the base fabric, wherein the low thermal emittance layer restricts heat transmission outward through the externally facing surface of the base fabric; and
            a high solar absorptance layer disposed on top of the low thermal emittance layer to form an outermost surface of the multilayered multifunctional heat-retention elements, wherein the high solar absorptance layer comprises a polymeric overlayer that traps solar radiation, and wherein the polymeric overlayer comprises a colorant that increases the solar absorption of the high solar absorptance layer,
        wherein the heat-retention material has a weighted average thermal emittance that is between 0.1 and 0.8.

16. The heat-retention material of claim 1, wherein the plurality of individualized multilayered multifunctional heat-retention elements are spaced apart by about 0.1 mm to about 10.0 mm.

* * * * *